US008252485B2

(12) United States Patent
Sun et al.

(10) Patent No.: US 8,252,485 B2
(45) Date of Patent: Aug. 28, 2012

(54) ELECTROCATALYST COMPOSITIONS AND PROCESSES FOR MAKING AND USING SAME

(75) Inventors: Yipeng Sun, Albuquerque, NM (US); Paolina Atanassova, Albuquerque, NM (US); James Brewster, Rio Rancho, NM (US); Leonard P. Perez, Bernalillo, NM (US); Hanwei Lei, Albuquerque, NM (US); Berislav Blizanac, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 785 days.

(21) Appl. No.: 11/685,446

(22) Filed: Mar. 13, 2007

(65) Prior Publication Data

US 2008/0226958 A1    Sep. 18, 2008

(51) Int. Cl.
*H01M 4/02*    (2006.01)
*H01M 4/36*    (2006.01)

(52) U.S. Cl. ........................................ 429/523; 429/524
(58) Field of Classification Search ............... 429/40
See application file for complete search history.

(56) References Cited

U.S. PATENT DOCUMENTS

| | | | |
|---|---|---|---|
| 5,068,161 A | 11/1991 | Keck et al. | |
| 6,066,410 A | 5/2000 | Auer et al. | |
| 6,074,692 A | 6/2000 | Hulett | |
| 6,221,523 B1 | 4/2001 | Chun et al. | |
| 6,238,534 B1 | 5/2001 | Mao et al. | |
| 6,326,098 B1 | 12/2001 | Itoh et al. | |
| 6,338,809 B1 | 1/2002 | Hampden-Smith et al. | |
| 6,601,776 B1 | 8/2003 | Oljaca et al. | |
| 6,740,434 B2 | 5/2004 | Surampudi et al. | |
| 6,753,108 B1 | 6/2004 | Hampden-Smith et al. | |
| 6,911,412 B2 | 6/2005 | Hampden-Smith et al. | |
| 2003/0059666 A1 | 3/2003 | Kourtakis | |
| 2003/0129477 A1 | 7/2003 | Hitomi | |
| 2003/0198849 A1 | 10/2003 | Hampden-Smith et al. | |
| 2004/0038808 A1 | 2/2004 | Hampden-Smith et al. | |
| 2004/0072683 A1 | 4/2004 | Kodas et al. | |
| 2004/0265678 A1 | 12/2004 | Hommura et al. | |
| 2005/0053826 A1 | 3/2005 | Wang et al. | |

(Continued)

FOREIGN PATENT DOCUMENTS

WO    9966574 A1    12/1999

(Continued)

OTHER PUBLICATIONS

The International Search Report and the Written Opinion of the International Searching Authority mailed Aug. 21, 2008.

(Continued)

*Primary Examiner* — Ula C Ruddock
*Assistant Examiner* — Jacob Marks
(74) *Attorney, Agent, or Firm* — Roberts Mlotkowski Safran & Cole, P.C

(57) ABSTRACT

In a method of producing a particulate electrocatalyst composition, a precursor medium comprising at least a first metal precursor, a liquid vehicle, and a substrate precursor to substrate particles is atomized into precursor droplets. The droplets are then heated to a reaction temperature of not greater than 700° C. to form composite particles comprising said first metal at least partly in an oxide form dispersed on said substrate particles. The composite particles are then collected and are heated at a first treatment temperature no greater than 250° C. in the presence of a reducing atmosphere to at least partly convert said oxide form to the metal.

37 Claims, 9 Drawing Sheets

U.S. PATENT DOCUMENTS

| | | | |
|---|---|---|---|
| 2005/0233183 A1* | 10/2005 | Hampden-Smith et al. | 429/12 |
| 2006/0127138 A1* | 6/2006 | Egawa | 399/297 |
| 2006/0135357 A1 | 6/2006 | Tsutsumi et al. | |
| 2006/0269824 A1 | 11/2006 | Hampden-Smith et al. | |

FOREIGN PATENT DOCUMENTS

| | | |
|---|---|---|
| WO | 2004095603 A2 | 4/2004 |
| WO | 2004038886 A | 5/2004 |
| WO | 2006018257 A2 | 2/2006 |
| WO | 2006045606 A1 | 4/2006 |
| WO | 2007061248 A1 | 5/2007 |

OTHER PUBLICATIONS

Masahiro Watanabe, Makoto Uchida and Satoshi Motoo, "Preparation of Highly Dispersed Pt + Ru Alloy Clusters and the Activity for the Electrooxidation of Methanol", J. Electroanal. Chem., 229 (1987) pp. 395-406.

Paolina Atanassova, et al., "Alloy Catalyst Compositions and Processes for Making and Using Same", U.S. Appl. No. 11/328,147, filed Jan. 10, 2006.

"Preparation of Highly Dispersed Pt + Ru Alloy Clusters and the Activity for the Electrooxidation of Methanol" Masaharo Watanabe et al, Laboratory of Electrocatalysts for Fuel Cells, Faculty of Enginnering, Yamanashi Univeristy, Takeda 4-3, Kofu (Japan), J.Electroanal. Chem., 229 (1987) 395-406, Elsevier Sequoia S.A., Lausanne-Printed in the Netherlands.

"Applications of the Gas Diffusion Electrode to a Backward Feed and Exhaust (BFE) Type Methanol Anode" Masahiro Watanabe et al, Laboratory of Electrocatalysts for Fuel Cells, Faculty of Engineering, Yamanashi Univeristy, Takeda 4-3, Kofu (Japan), J.Electroanal. Chem., 199 (1986) 311-322, Elsevier Sequoia S.A., Lausanne-Printed in the Netherlands.

"PEM Fuel Cells for Transportation and Stationary Power Generation Applications" S.J.C. Cleghorn, X. Ren, T.E. Springer, M.S. Wilson, C. Zardzinski, T.A. Zawodzinski and S. Gottesfeld. Electronic and Electrochemical Materials and Devices Group, MST-11, MS D-429, Los Alamos National Laboratory. Los Alamos, NM 8745, U.S.A.

* cited by examiner (A)

(B)

ELECTROCATALYST COMPOSITIONS AND PROCESSES FOR MAKING AND USING SAME

FIELD

This invention relates to electrocatalyst compositions, their production and their use in fuel cell electrodes.

BACKGROUND

Fuel cells are electrochemical devices in which the energy from a chemical reaction is converted to direct current electricity. During operation of a fuel cell, a continuous flow of fuel, e.g., hydrogen (or a liquid fuel such as methanol), is fed to the anode while, simultaneously, a continuous flow of an oxidant, e.g., air, is fed to the cathode. The fuel is oxidized at the anode causing a release of electrons through the agency of a catalyst. These electrons are then conducted through an external load to the cathode, where the oxidant is reduced and the electrons are consumed, again through the agency of a catalyst. The constant flow of electrons from the anode to the cathode constitutes an electrical current which can be made to do useful work.

The Polymer Electrolyte Membrane fuel cell (PEMFC) is one type of fuel cell likely to find wide application as a more efficient and lower emission power generation technology in a range of markets including stationary and portable power devices and as an alternative to the internal combustion engine in transportation. PEM fuel cells use a solid polymer as an electrolyte and porous carbon electrodes containing a platinum catalyst. They need only hydrogen, oxygen from the air to operate and do not require corrosive fluids like some fuel cells. They are typically fueled with hydrogen supplied from storage tanks or onboard reformers.

The Direct Methanol Fuel Cell (DMFC) is similar to the PEMFC in that the electrolyte is a polymer and the charge carrier is the hydrogen ion (proton). However, liquid methanol ($CH_3OH$) is oxidized in the presence of water at the anode generating $CO_2$, hydrogen ions and the electrons that travel through the external circuit as the electric output of the fuel cell. The hydrogen ions travel through the electrolyte and react with oxygen from the air and the electrons from the external circuit to form water at the cathode completing the circuit.

In the PEMFC and DMFC the combined laminate structure formed from the membrane and the two electrodes is known as a membrane electrode assembly (MEA). The MEA will typically comprise several layers, but can in general be considered, at its basic level, to have five layers, which are defined principally by their function. On either side of the membrane an anode and cathode electrocatalyst are incorporated to increase the rates of the desired electrode reactions. In contact with the electrocatalyst-containing layers, on the opposite face to that in contact with the membrane, are anode and cathode gas diffusion substrate layers.

The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum or platinum-ruthenium metal based, to maximize the electrochemical oxidation of hydrogen or methanol. The anode electrocatalyst layer is also designed to comprise some level of the proton-conducting electrolyte in contact with the same electrocatalyst reaction sites. With acidic electrolyte types protons are produced as the product of the reaction occurring at the anode and these can then be efficiently transported from the anode reaction sites through the electrolyte to the cathode layers.

The cathode gas diffusion substrate is also designed to be porous and to allow oxygen or air to enter the substrate and diffuse through to the electrocatalyst layer reaction sites. The cathode electrocatalyst combines the protons with oxygen to produce water and is also designed to comprise some level of the proton-conducting electrolyte in contact with the same electrocatalyst reaction sites. Product water then has to diffuse out of the cathode structure. The structure of the cathode has to be designed such that it enables the efficient removal of the product water.

The complete MEA can be constructed by several methods. The electrocatalyst layers can be bonded to one surface of the gas diffusion substrates to form what is known as a gas diffusion electrode. The MEA is then formed by combining two gas diffusion electrodes with the solid proton-conducting membrane. Alternatively, the MEA may be formed from two porous gas diffusion substrates between which is sandwiched a solid proton-conducting polymer membrane having electrocatalyst layers on both sides (also referred to as a catalyst coated membrane or CCM); or indeed the MEA may be formed from one gas diffusion electrode, one liquid diffusion substrate and a solid proton-conducting polymer having an electrocatalyst layer on the side facing the gas/liquid diffusion substrate.

Although the theory behind fuel cell operation has been known for many years, there has been difficulty producing commercially viable fuel cells due to technological barriers, and also due to the availability of more cost-effective energy sources such as petroleum. However, devices using petroleum products, such as the automobile, produce significant pollution and may eventually become obsolete with the depletion of petroleum resources. As a result, there is a need for an alternative means for producing energy. Fuel cells are a promising alternative source of energy in that they are relatively pollution-free and utilize hydrogen, a seemingly infinite fuel source.

Among the critical issues that must be addressed for the successful commercialization of fuel cells is developing MEAs exhibiting the highest possible performance expressed as power density per unit area ($mW/cm^2$) at certain operating voltage—typically 0.4 to 0.55 V for the DMFC system. Producing MEAs with high absolute performance is highly desirable because it allows the manufacture of smaller, lighter, longer running and more efficient DMFC-based power sources. Cost and durability are the other two major requirements of the DMFC MEAs.

There are several key elements in ensuring high performing MEA in DMFC configuration—electrocatalyst, printed layers and MEA structures, membrane and gas diffusion electrodes. Of these, the electrocatalyst is the most significant performance and cost factor. Pt and PtRu blacks are the electrocatalysts widely used for achieving high power densities, however they suffer from inherently low utilization when printed in electrode layers. Moreover, they lack the requisite durability and are too expensive for commercial viability. Thus, in more recent applications, the electrocatalytic material, particularly Pt and PtRu, is dispersed as nanoparticles on a particulate support material, such as a carbon black or metal oxide.

The motivation for developing supported catalysts is the potential for high precious metal utilization, which becomes especially important when the DMFC devices are targeted for mass market introduction. Achieving high utilization of the expensive precious metal catalysts is highly desirable since it has impact on both performance and the cost. Ability to achieve highest performance value expressed by highest power with lowest amount of precious metal (mW/mgPt) ensures DMFC devices can be cost competitive with the existing power sources and be successfully commercialized. Another critical factor in meeting the commercialization goals for DMFC is meeting durability targets, which are typically several thousand hours. Supported electrocatalysts typically exhibit improved durability as compared with metal blacks.

The typical production method for carbon-supported Pt and PtRu electrocatalysts is a batch process, which starts by precipitating or impregnating Pt metal precursors followed by chemical reduction techniques in slurry of carbon black. Where necessary, the addition/alloying of the second metal (Ru) is achieved by precipitation of the second precursor onto the Pt clusters and the alloying of the PtRu is achieved through reduction in hydrogen at high temperature (see, for example, U.S. Pat. No. 6,326,098). Another approach (see, for example, U.S. Pat. No. 5,068,161 and "Preparation of Highly Dispersed Pt+Ru Alloy Clusters and the Activity for the Electrooxidation of Methanol" by Watanabe et al., *J. Electroanal. Chem.*, 229 (1987), pages 395-406) relies on colloidal precipitation and deposition of the PtRu colloidal particles onto the carbon support. All of these synthesis methods very often lead to the formation of PtRu clusters which do not have simultaneously high dispersion, high degree of crystallinity and high stability (or durability when exposed to acidic environment during the operation of DMFC). The poor stability of PtRu alloys and the dissolution of Ru during long-term operation of the DMFC is a major contributing factor for the loss of initial performance and poor long-term durability. The ability to generate highly performing and durable PtR catalysts with a high degree of normalized performance (mW/mgPt) and utilization is necessary for commercialization of direct methanol fuel cells.

More recently, a highly reproducible, low cost, continuous powder manufacturing process based on spray conversion has been developed, which is capable of achieving excellent control over the dispersion, composition and microstructure of electrocatalyst compositions leading to unrivaled electrochemical performance. In the spray conversion process, a liquid-containing feedstock comprising dissolved non-volatile electrocatalyst precursors and suspended solids is atomized to form droplets and the droplets are heated to form powders. This process offers the advantage of producing electrocatalyst powders with unique morphology comprising a combination of highly active and dispersed nanoparticles on a mesoporous carbon support with a micron size aggregate structure. It is believed that this combination offers the most advantageous layer structure when the catalysts are printed onto a polymer electrolyte membrane. In addition when PtRu alloy-based supported catalysts are produced by the spray based technology, simultaneously high PtRu crystallite dispersion can be achieved, combined with high degree of alloying and extended durability when utilized in fuel cell operating conditions.

A representative example of the spray conversion process can be found in U.S. Patent Application Publication No. 2004/0072683, which discloses a process for making an electrocatalyst powder batch, comprising the steps of: a) providing a liquid-containing precursor composition to said electrocatalyst powder; b) atomizing said liquid-containing precursor into precursor droplets; c) heating said precursor droplets to a reaction temperature of not greater than about 700° C. to form electrocatalyst particles; and d) collecting said electrocatalyst particles. In one embodiment, the electrocatalyst particles are composite electrocatalyst particles comprising a support phase, such as particulate carbon, and an active species phase, such as platinum and/or ruthenium, dispersed on the support phase. When the active species phase is a metal or metal alloy, additives capable of reducing the metal precursor(s) to the metal/alloy at the temperatures employed in step (c) are included in the liquid-containing precursor composition so that the desired reduction is achieved during the spray conversion process.

According to the present invention, it has now been found that when spray conversion is used to produce an electrocatalyst composition, the reduction and, where applicable, the alloying step can be effected as a separate low temperature (no greater than 250° C.) post treatment step in a reducing atmosphere, rather than by adding a reducing agent to the liquid-containing precursor composition such that the reduction occurs during the spray conversion process. Surprisingly, it is found that the product of such a low temperature post treatment step is a novel electrocatalyst composition having enhanced surface area and specific activity.

SUMMARY

In one aspect, the present invention resides in a method for making a particulate electrocatalyst composition, the method comprising:

a) providing a precursor medium comprising at least a first metal precursor, a liquid vehicle, and a substrate precursor to substrate particles;

b) atomizing said precursor medium into precursor droplets;

c) heating said precursor droplets to a reaction temperature of not greater than 700° C. to form composite particles comprising said first metal at least partly in an oxide form dispersed on said substrate particles; and d) heating said composite particles at a first treatment temperature no greater than 250° C. in the presence of a reducing atmosphere to at least partly convert said oxide form to the metal.

Conveniently, said heating (d) is conducted at at least one first treatment temperature of about 50° C. to 250° C., such as about 60° C. to about 200° C., such as about 80° C. to about 180° C., for example about 100° C. to about 150° C.

Conveniently, said heating (d) is conducted for a time of about 0.5 hour to about 10 hours, such as about 1 hour to about 8 hours, for example about 1 hour to about 4 hours.

In one embodiment, said reducing atmosphere comprises hydrogen, for example a mixture of nitrogen and hydrogen.

In one embodiment, the method includes (e) heating said composite particles in the presence of a reducing atmosphere at a second treatment temperature higher than first treatment temperature but no greater than 500° C. Conveniently, said heating at said second treatment temperature is conducted for a time of about 0.5 hour to about 8 hours, for example about 1 hour to about 4 hours.

Conveniently, the method further comprises cooling said particles from said treatment temperature in the presence of a non-oxidizing atmosphere, such as nitrogen.

Conveniently, said first metal comprises platinum.

Conveniently, said precursor medium comprises at least a second metal precursor and in one embodiment said second metal comprises ruthenium.

In one embodiment, said electrocatalyst composition comprises a binary alloy of platinum and ruthenium as an active species and said heating (d) at least partly converts oxide forms of platinum and ruthenium to the respective metals and also produces said binary alloy.

Conveniently, said substrate particles comprise carbon particles.

In a further aspect, the invention resides in an electrocatalyst composition comprising carbon substrate particles and nanoparticles comprising a platinum and ruthenium binary alloy disposed on the surface of the substrate particles, wherein the electrocatalyst composition, when subjected to CO stripping voltammetry in 0.5 M $H_2SO_4$ at 60° C. and 20 mV/s, exhibits a CO stripping peak at less than 0.46 V, for example less than 0.44 V, wherein said peak has a width at half maximum height in excess of 0.05 V, such as in excess of 0.08 V.

Conveniently, said CO stripping peak has a width at half maximum height of not more than 0.1 V.

In yet a further aspect, the invention resides in an electrocatalyst composition comprising carbon substrate particles and nanoparticles comprising a platinum and ruthenium binary alloy disposed on the surface of the substrate particles, wherein the electrocatalyst composition has an electrochemically accessible surface area, as measured by CO stripping voltammetry in 0.5 M $H_2SO_4$ at 60° C. and 20 mV/s, of at least 80 $m^2$/g, such as at least 90 $m^2$/g, of platinum and ruthenium.

Conveniently, said nanoparticles have a number average particle size of from about 2 to about 5 nm, for example about 2.5 to about 4 nm, such as about 2.5 to about 3.5 nm.

Conveniently, said carbon particles have a number average particle size of from about 10 to about 100 nm, for example about 20 to about 80 nm, such as about 30 to about 50 nm.

Conveniently, said carbon substrate particles are agglomerated into substantially spherical, mesoporous agglomerates having a weight average particle size of about 1 to about 10 microns, for example about 3 to about 8 microns, such as about 5 to about 6 microns.

In still a further aspect, the invention resides in an electrocatalyst composition comprising carbon particles and nanoparticles comprising a platinum and ruthenium binary alloy disposed on the surface of the substrate particles wherein, when the electrocatalyst composition is used in an anode layer of a membrane electrode assembly having said anode layer and a cathode layer and when the electrocatalyst composition is present in the anode layer at a loading of 3 mg of PtRu/$cm^2$ of the anode layer and when the membrane electrode assembly is used in a direct methanol fuel cell operating under conditions including a supply of 1M methanol at a rate of 3 ml per minute to the anode layer, a supply of 200 sccm of humidified $H_2$ to the cathode layer, an output voltage of 0.4 V and a temperature of 60° C., the electrocatalyst composition has a mass activity of at least 70 mA, such as at least 90 mA, per mg of platinum and ruthenium in the anode layer.

DETAILED DESCRIPTION

Figure 1:
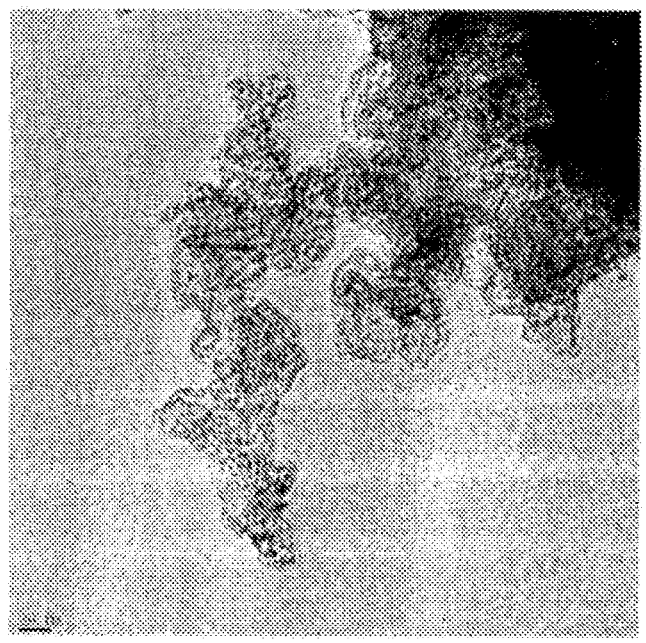
FIG. 1 is a Transmission Electron Micrograph (TEM) of the spray dried, carbon-supported PtRu electrocatalyst composition of Example 1 (no post treatment).

The present invention is directed to particulate electrocatalyst compositions, and to methods for making such compositions. In one aspect, the invention is directed to the use of spray conversion for making an electrocatalyst composition in which the active species is a metal, such as platinum, or more particularly, a binary metal alloy, such as a platinum-ruthenium alloy, supported as nanoparticles on a particulate substrate. In this approach, the precursors to the final metal or alloy composition are dissolved in a solvent containing dispersed substrate particles. Droplets of this suspension are formed, entrained in a carrier gas, and heated under conditions effective to cause the solvent to vaporize. As the solvent vaporizes, the precursors are converted to an intimate mixture of metal oxide species disposed on the substrate particles. After the catalyst particles are collected, they are subjected to heat treatment in a reducing atmosphere at a temperature up to 250° C. to at least partially convert the oxide species to the metal form and, where applicable, achieve alloying of the metals. Because of the small particle size and intimate mixing of the metal-containing compositions formed by the spray conversion process, it is surprisingly found that post treatment temperatures less than or equal to 250° C., such as 90° C. to 200° C., are sufficient not only to effect sufficient reduction of the oxide species but also significant alloying of the resultant metals.

The resultant electrocatalyst composition comprises substrate particles on which the metal/metal alloy active species is highly dispersed as nanoparticles typically having a number average particle size of from about 2 to about 5 nm, for example about 2.5 to about 4 nm, such as about 2.5 to about 3.5 nm. The catalyst particles and, in particular, the metal/alloy particles thereof have a high degree of uniformity from particle to particle since each particle is exposed to essentially the same time-temperature profile in the spray conversion and post treatments steps.

Generally, the substrate particles have a number average particle size of from about 10 to about 100 nm, for example about 20 to about 80 nm, such as about 30 to about 50 nm, and are agglomerated into substantially spherical, mesoporous agglomerates having a weight average particle size of about 1 to about 10 microns, for example about 3 to about 8 microns, such as about 5 to about 6 microns.

In one embodiment, the substrate particles are formed of carbon and the metal nanoparticles comprise a platinum and ruthenium binary alloy and the electrocatalyst composition produced by the present process exhibits unique electrochemical properties. In particular, the electrocatalyst composition, when subjected to CO stripping voltammetry in 0.5 M $H_2SO_4$ at 60° C. and 20 mV/s, exhibits a CO stripping peak with a width at half maximum height in excess of 0.05 V, such as in excess of 0.08 V, for example in excess of 0.1 V and/or an electrochemically accessible surface area of at least 80 $m^2/g$, such as at least 90 $m^2/g$, of platinum and ruthenium.

Spray Conversion

In the spray conversion step of the present process, a precursor medium is prepared comprising a liquid vehicle, a substrate precursor to substrate particles, at least a first metal precursor to a first electrocatalytic metal, normally platinum, optionally a second metal precursor to a second electrocatalytic metal, normally ruthenium, that will form a binary alloy with the first catalytic metal, and generally, one or more additives or other components. The precursor medium is then atomized to produce droplets of the precursor medium and the droplets are then heated to a reaction temperature of not greater than 700° C. to vaporize the liquid vehicle and form composite particles comprising said first metal at least partly in an oxide form dispersed on said substrate particles As used herein, the term "precursor" means a compound that has a first form in the precursor medium, which may be converted to a second form (which is different from the first form) in the composite particles of the final electrocatalyst, optionally through one or More intermediate forms between the first form and the second form. Two types of precursors, both of which are present in the precursor medium, include: (1) metal precursor(s); and (2) substrate precursor(s). Specifically, the or each metal precursor is converted to its corresponding metal (through a metal oxide intermediate) and generally, where the precursor medium comprises first and second metal precursors, the metals formed from the metal precursors are then alloyed to form the binary alloy nanoparticles. Similarly, the substrate precursor is converted to substrate particles, typically substrate microparticles, on which the metal/alloy nanoparticles are disposed.

The liquid vehicle is used to impart flowability to the precursor medium and may be any liquid that is convenient and compatible for processing the precursor(s) and reagent(s) that are to be included in the precursor medium. The liquid vehicle may comprise a single liquid component, or may be a mixture of two or more liquid components, which may or may not be mutually soluble in one another. In some cases, the liquid vehicle may be selected to act as a solvent for one or more of the precursors to be included in the precursor medium. In other cases, the liquid vehicle may be selected based on its volatility. For example, a liquid vehicle with a high vapor pressure may be selected so that the liquid vehicle is easily vaporized and removed from the droplets to the gas phase of the aerosol during the formation of the particles. In other cases, the liquid vehicle may be selected for its hydrodynamic properties, such as viscosity characteristics of the liquid vehicle. For example, if one or more precursors is to be included in the precursor medium in the form of dispersed particulates, a liquid vehicle having a relatively high viscosity may be selected to inhibit settling of the precursor particles. As another example, a liquid vehicle with a relatively low viscosity may be selected when it is desired to produce smaller droplets of precursor medium during the generating of the aerosol. In still other cases, the liquid vehicle may be selected to reduce or minimize contamination of the composite particles and/or production of undesirable byproducts during the generating of the aerosol or the formation of the composite particles, especially when using organic components in the liquid vehicle.

The liquid vehicle may be an aqueous liquid, an organic liquid or a combination of aqueous and organic liquids. Aqueous liquids are generally preferred because of their low cost, relative safety and ease of use. For example, water has the advantage of being non-flammable, and when vaporized during the formation of the particles does not tend to contribute to formation of byproducts that are likely to complicate processing or contaminate particles. Moreover, aqueous liquids are good solvents for a large number of precursor materials, although attaining a desired level of solubility for some materials may involve modification of the aqueous liquid, such as by pH adjustment. In some situations, however, organic liquids may be desirable for the liquid vehicle. This might be the case, for example, when it is desired to dissolve a precursor into the liquid vehicle in situations when the precursor is not adequately soluble in aqueous liquids, or when aqueous liquids are otherwise detrimental to the precursor. For example, an organic liquid vehicle might be necessary to solubilize a number of organic or organometallic precursor materials.

Additionally, the precursor medium comprises one or more substrate precursors. As used herein, a "substrate precursor" is a composition that can be converted to or forms the substrate particles in the final electrocatalyst composition. In one embodiment, the substrate precursor comprises substrate particles suspended (e.g., as a colloidal suspension) in the liquid medium, which suspended substrate particles form the substrate particles of the electrocatalyst as the liquid vehicle is removed from the precursor medium. In other aspects, the substrate precursor undergoes a reaction to provide the substrate for the composite particles. For example, the substrate precursor optionally is thermally decomposed at elevated temperature or is reduced to form the substrate in the composite particles. In another embodiment, the substrate precursor could process without reaction. For example, the substrate precursor optionally is initially dissolved in the liquid vehicle, and a substrate precipitate of the substrate precursor is formed as the liquid vehicle is removed from the droplets, e.g., as the composite particles are formed. This might be the case, for example, when the substrate precursor comprises an organic salt, organic compound or a polymer dissolved in the liquid medium, which organic salt, organic compound or polymer precipitates out to form all or part of the substrate when the liquid vehicle is vaporized during the formation of the composite particles.

In one embodiment, the substrate precursor comprises carbon, optionally functionalized carbon, and the substrate precursor comprises suspended carbon black or modified carbon black particles. For example, the substrate precursor could be in the form of colloidal-size carbon particles in the precursor medium, which colloidal-size carbon particles become the substrate of the composite particles made during formation of the composite particles. Some of the colloidal-size substrate particles may or may not fuse together or agglomerate during the formation of the composite particles. When the precursor medium comprises colloidal-sized substrate particles, e.g., carbon particles, the precursor medium optionally comprises colloidal-size substrate particles in an amount no greater than 60, no greater than 40 or no greater than 20 weight percent. Moreover, such colloidal-size substrate particles preferably have an average size of no larger than about 300 nm, e.g., no larger than about 150 nm, no larger than about 100 nm, or no larger than 50 nm. Additionally or alternatively, the substrate precursor may comprise carbon fibers, carbon nanotubes or carbon flakes instead of or in addition to colloidal-size carbon particles.

The precursor medium further comprises at least one precursor to a first catalytic metal, particularly platinum, and at least one precursor to a second catalytic metal, particularly ruthenium. As used herein, the term "metal precursor" means a metal-containing compound that is dissolved or dispersed in the liquid vehicle, and which may be converted, at least in part, into a corresponding elemental metal (normally through a metal oxide intermediate), and which ultimately may be alloyed to form alloy nanoparticles that are disposed on the substrate in the final electrocatalyst particles.

Where the first catalytic metal is platinum, suitable precursors include tetraamine platinum hydroxide ($Pt(NH_3)_4(OH)_2$); tetraamineplatinum(II)nitrate ($Pt(NH_3)_4(NO_3)_2$); hydroxoplatinic acid ($H_2Pt(OH)_6$); platinum nitrates; platinum amine nitrates; platinum tetrachloride ($PtCl_4$); sodium hexahydroxyplatinum ($Na_2Pt(OH)_6$); potassium hexahydroxyplatinum ($K_2Pt(OH)_6$) and $Na_2PtCl_4$. Where the second catalytic metal is ruthenium, suitable precursors include ruthenium β-diketonates; ruthenium nitrosyl nitrate ($Ru(NO)(NO_3)_3$); potassium perruthenate ($K_3RuO_4$); sodium perruthenate ($Na_3RuO_4$); $(NH_4)_3Ru_2O_7$; $NH_4Ru_2O_7$; $Ru_3(CO)_{12}$ and ruthenium amine acetate.

In addition to the above-described components, the precursor medium optionally includes one or more additives or reagents. Suitable additives include an oxidizing agent to assist in converting the metal precursor(s) to an oxide species during the spray conversion step and a polymer and/or surfactant to modify the properties of the precursor medium, e.g., to facilitate the spray processing thereof.

After formation, the precursor medium is atomized to produce an aerosol comprising droplets of the precursor medium dispersed and suspended in a carrier gas. The droplets may be generated using any appropriate apparatus for finely dividing liquids to produce droplets. Apparatuses for generating such droplets are referred to by a variety of names, including liquid atomizers, mist generators, nebulizers and aerosol generators.

One suitable apparatus for generating the required aerosol is an ultrasonic aerosol generator, in which ultrasonic energy is used to form or assist formation of the droplets. One type of ultrasonic aerosol generator is a nozzle-type apparatus, with the nozzle ultrasonically energizable to aid formation of droplets of a fine size and narrow size distribution. Another example of an ultrasonic aerosol generator ultrasonically energizes a reservoir of precursor medium, causing atomization cones to develop, from which droplets of the precursor medium form, and the droplets are swept away by a flowing carrier gas. The reservoir-type ultrasonic aerosol generators can produce very small droplets of a relatively narrow size distribution and are preferred for use in applications when the final composite particles are desired to be in a range of from about 0.2 to about 5 microns (weight average particle size), and especially when a narrow size distribution of the particles is desired. An example of a reservoir-type ultrasonic aerosol generator is described, for example, in U.S. Pat. No. 6,338,809, the entire contents of which are incorporated by reference herein. Although both the nozzle-type ultrasonic aerosol generator and the reservoir-type ultrasonic aerosol generator produce small droplets of a relatively narrow size distribution, the reservoir-type generally produces finer droplets of a more uniform size.

Another example of an apparatus for generating droplets is a spray nozzle (not ultrasonically energized). Several different types of spray nozzles exist for producing droplets in aerosols, and new spray nozzles continue to be developed. Some examples of spray nozzles include 2-fluid nozzles, gas nozzles and liquid nozzles. Spray nozzle generators have an advantage of very high throughput compared to ultrasonic generators. Droplets produced using spray nozzles, however, tend to be much larger and to have a much wider size distribution than droplets produced by ultrasonic generators. Therefore, spray nozzles are preferred for making relatively large composite particles. Other types of droplet generators that may be used include rotary atomizers, and droplet generators that use expansion of a supercritical fluid or high pressure dissolved gas to provide the energy for droplet formation. Still another process for generating droplets is disclosed in U.S. Pat. No. 6,601,776, the entire contents of which are incorporated herein by reference.

The carrier gas used as the transport medium for the aerosol may be any convenient gas composition and may be, for example, a single component gas composition (such as for example pure nitrogen gas) or a mixture of multiple gas components (such as for example air, or a mixture of nitrogen and hydrogen). In addition, the carrier gas can be selected so as to be substantially non-reactive during the spray conversion process or alternatively may be selected so as to participate in, for example, the conversion of the metal precursor(s) to an oxide species during spray conversion.

After the aerosol is generated, the aerosol is heated in order to: (1) remove at least a portion of the liquid vehicle in the droplets; (2) convert the substrate precursor to the supporting substrate particles; and (3) convert the metal precursors to the corresponding metals and/or metal oxides. Typically these processes are accomplished in a single heating by heating the aerosol to a reaction temperature of not greater than 700° C., such as not greater than 600° C. (e.g., from about 400° C. to about 550° C. or from about 450° C. to about 500° C.) for a period of time of at least about 1 seconds, e.g., at least 3 second, at least about 20 seconds or at least about 100 seconds. Conveniently, the heating is conducted in a spray dryer, since spray dryers have the advantage of having high throughput, which allows large amounts of particles to be produced.

In an alternative embodiment, the step of removing the liquid vehicle from the droplets may be conducted separately from the heating to convert the metal precursors to their corresponding metals and/or metal oxides. For example, the removal of the liquid vehicle from the droplets may be performed in a reactor, furnace or using spray drying equipment, to produce intermediate particles that are collected for further processing. The intermediate particles may then be subjected to one or more further heating steps in a separate reactor or furnace (e.g. box furnace, belt furnace, tray furnace, rotary furnace or hydrogen furnace) to convert the substrate precursor to the supporting substrate particles and/or convert the metal precursors to the corresponding metals and/or metal oxides In any event, after spray processing is complete, the particulate product is separated from the carrier gas by any convenient solid/gas separation technique, for example using a filter, a cyclone, bag house, or electrostatic precipitator. Conveniently, separation of the particulate product may include an initial quenching step whereby the temperature of the product particles is reduced rapidly, for example, within about 0.1 second, to ambient to maintain the crystalline structure of the nanoparticles or substrate and avoid or limit crystal growth.

Post Treatment

The product of the spray conversion step comprises particles of the substrate material, normally carbon, on which are dispersed nanoparticle domains of an oxide form of the desired electrocatalytic metal or metals. The product is then subjected to at least a first post treatment to convert the oxide species to the elemental metal and, where the electrocatalytic metals are platinum and ruthenium, to at least partially alloy the metal species.

The first post treatment involves initially heating the particulate product from the temperature used for its collection and/or or storage, normally ambient temperature, to a reduction treatment temperature of up to 250° C., such as from about 50° C. to 250° C., such as about 60° C. to about 200° C., such as about 80° C. to about 180° C., for example about 100° C. to about 150° C. The initial heating is conducted at a rate of about 1 to about 10° C./minute, such as about 2 to about 5° C./minute, in a non-oxidizing or reducing atmosphere. When the desired reduction treatment temperature has been reached, the atmosphere is maintained as, or changed to, a reducing atmosphere and product is maintained at this temperature for a time of about 0.5 hour to about 10 hours, such as about 1 hour to about 8 hours, for example about 1 hour to about 4 hours. After the reduction treatment is complete, the product is allowed to cool to ambient temperature again at a rate of about 1 to about 10° C./minute, such as about 2 to about 5° C./minute, in a non-oxidizing or reducing atmosphere.

Typically, the reducing atmosphere employed in the first post treatment procedure comprises hydrogen and more particularly a mixture of nitrogen and hydrogen, for example a mixture of nitrogen and hydrogen comprising up to 50 vol. %, such as up to 10 vol. %, hydrogen. Where a non-oxidizing atmosphere is used in the heating and cooling phases of the first post treatment procedure, a suitable atmosphere comprises nitrogen.

In some embodiments, the first post treatment can be conducted in a plurality of stages, each at a different temperature no greater than 250° C. and each in the presence of a reducing atmosphere. For example, the first post treatment could include heating the particulate product at a rate of about 1 to about 10° C./minute to an initial reduction treatment temperature of 60° C., holding the product at 60° C. for 2 hours in the reducing atmosphere, raising the temperature again at a rate of about 1 to about 10° C./minute to a further reduction treatment temperature of 80° C., and holding the product at 80° C. for a further 1 hour in the reducing atmosphere.

Despite the relatively low temperature employed in the first post treatment step described above, it is found that the majority of the oxide species generated during the spray conversion step are converted to the corresponding metallic species during post treatment. Moreover, where the metallic species are platinum and ruthenium, it is found that the post treatment step not only reduces the oxide species to the corresponding metals but also converts most of the metals to a platinum/ruthenium alloy. The degree of alloying is readily determined by X-ray diffraction (XRD) and generally the XRD of the post treated product exhibits a relatively strong peak at a $2\theta$ value of about 40.387 corresponding to the (111) diffraction peak of the PtRu alloy and indicating significant alloying. Little or no peak is present at $2\theta=43.737$, indicating the substantial absence of metallic ruthenium not alloyed with the platinum.

In some cases, it may be desirable to subject the particulate product to a second post treatment after the first post treatment and at a second treatment temperature higher than the highest first treatment temperature but no greater than 500° C., such as from about 150° C. to about 500° C., and also in the presence of a reducing atmosphere. Conveniently, said heating at said second treatment temperature is conducted for a time of about 1 hour to about 8 hours, for example about 1 hour to about 4 hours. Typically, the reducing atmosphere employed in the second post treatment comprises hydrogen, such as a mixture of hydrogen and nitrogen and especially the same nitrogen/hydrogen mixture used in the first post treatment. This optional higher temperature second post treatment is believed to increase durability of the electrocatalyst.

Electrocatalyst Composition

The electrocatalyst compositions produced by the present method comprises electrically conductive substrate particles on which are dispersed nanoparticles of one or more metals and/or metal alloys.

In one embodiment, the substrate particle comprises carbon. In another aspect, the substrate particle consists essentially of carbon. The carbon may be in a variety of forms such as, for example, graphitic carbon, carbon nanotubes, carbon black porous carbon, carbon-60 (bucky ball), or a combination thereof. Ideally, the substrate particle has a high surface area, e.g., on the order of at least about 100 $m^2/g$, such as at least about 300 $m^2/g$, for example at least about 500 $m^2/g$, for example at least 1000 $m^2/g$.

Typically, the substrate particles comprise an agglomeration of a plurality of smaller substrate nanoparticles. These substrate nanoparticles optionally have a number average particle size, as determined by TEM and/or SEM, of from about 10 to about 100 nm, for example about 20 to about 80 nm, such as about 30 to about 50 nm. The individual substrate nanoparticles agglomerated into substantially spherical, mesoporous agglomerates having a weight average particle size of about 1 to about 10 microns, for example about 3 to about 8 microns, such as about 5 to about 6 microns.

The number average particle diameter of the metal-containing nanoparticles may be characterized by electron microscopy. Typically, the nanoparticles have a number average particle size (e.g., diameter) of from about 1 nm to about 10 nm, such as from about 2 to about 5 nm, for example about 2.5 to about 4 nm, such as about 2.5 to about 3.5 nm.

The distance between adjacent metal-containing nanoparticles in the composite catalyst particle may vary widely depending on the desired end use for the electrocatalyst particles. In terms of absolute numbers, the average distance between adjacent metal-containing nanoparticles in the composite particles optionally is less than about 30 nm, e.g., less than about 20 nm, less than about 10 nm, less than about 5 nm, less than about 3 nm or less than about 2 nm. In terms of absolute numbers, the average distance between adjacent nanoparticles in the composite particles optionally is greater than about 1 nm, e.g., greater than about 3 nm, greater than about 5 nm, greater than about 10 nm, greater than about 20 nm.

In one aspect, the metal-containing nanoparticles are spheroidal, meaning that they are generally of spherical shape, even if not perfectly spherical. Optionally, a majority of the nanoparticles have a morphology that is spherical, hollow, rod, flake, platelet, cubed or trigonal.

The optimal weight ratio of metal-containing nanoparticles to the total weight of the catalyst (nanoparticles and substrate particle) can vary depending mostly on the surface area of the support. In one embodiment, the average weight ratio of the nanoparticles to the entire composite particle, e.g., electrocatalyst composition, ranges from about 5 to about 95, or from about 10 to 90 or from about 20 to about 80. The nanoparticle loading also may be expressed as a "surface concentration," defined herein as the mass of alloy nanoparticles per unit area of the surface of the substrate particles. In this aspect surface concentration optionally ranges from about 0.01 $g/m^2$ to about 1 $g/m^2$, e.g., from about 0.01 $g/m^2$ to about 0.1 $g/m^2$ or from about 0.05 $g/m^2$ to about 0.5 $g/m^2$. In another aspect, referred to herein as "normalized active surface area," the nanoparticle loading may be expressed in terms of active area normalized by the substrate surface area. In this aspect, the normalized active surface area optionally ranges from about 0.01 to about 0.8, e.g., from about 0.05 to about 0.5 or from about 0.1 to about 0.3.

The elemental composition of the metal-containing nanoparticles may vary widely depending on the desired application and the catalytic activity that is desired. In general, however, the metal-containing nanoparticles comprise platinum, either in elemental or alloyed form. In one preferred embodiment, the metal-containing nanoparticles comprise a binary alloy of platinum and ruthenium, in which the atomic ratio of platinum to ruthenium varies between about 0.25:1 and about 4:1, such as between about 0.5:1 and about 2:1.

Where the substrate particles comprise carbon and the metal nanoparticles comprise a platinum/ruthenium binary alloy, it is found that the present electrocatalyst composition exhibits a novel and advantageous combination of properties. In particular, the electrocatalyst composition, when subjected to CO stripping voltammetry in 0.5 M $H_2SO_4$ at 60° C. and 20 mV/s, exhibits a CO stripping peak with a width at half maximum height in excess of 0.05 V, such as in excess of 0.08 V, for example in excess of 0.1 V and/or an electrochemically accessible surface area of at least 80 $m^2/g$, such as at least 90 $m^2/g$, of platinum and ruthenium.

CO stripping voltammetry is a well-established technique for measuring the electrochemical properties of electrocatalyst compositions and all CO stripping voltammetry tests measurements described herein are conducted by the thin film rotating disk electrode (TFRDE) method following the procedure described in detail in Example 10

Uses of the Electrocatalyst Composition

The electrocatalyst composition described herein can be used in the production of a variety of electrocatalytic devices, including PEM fuel cells, high temperature fuel cells, alkaline and phosphoric acid fuel cells, direct methanol fuel cells, electrolyzers, and batteries. In particular, however, the present electrocatalyst composition is useful in the fabrication of membrane electrode assemblies (MEAs) for direct methanol fuel cells.

MEAs are fully described in Published U.S. Patent Application No. US 2003/0198849 A1, published Oct. 23, 2003, the entirety of which is incorporated herein by reference. For example, an ink containing alloy nanoparticles (e.g., on substrate particles) can be printed, e.g., direct write printed, on an electrode substrate of a polymer electrolyte membrane to form an electrocatalyst layer. See U.S. Pat. No. 6,911,412 B2, the entirety of which is incorporated herein by reference, for a description of direct-write deposition processes for forming MEA electrodes. Catalysts used in MEAs can be very expensive (e.g., platinum metal), and the ability to fabricate MEAs using alloy nanoparticulate-sized catalyst particles can greatly reduce the cost of manufacturing MEAs. This reduction in cost may be achieved because the nanoparticles have a very high overall surface area which provides increased catalytic efficiency and increases specific activity per surface area due to formation of an alloy phase. Additionally, increased surface area and change in the physical properties of the surface of electrocatalysts containing alloys can also contribute to improved performance of the MEAs such as operation at lower humidification levels of the reactant gases and/or for an increased durability of the MEAs and fuel cells due to higher stability of the alloy nanoparticles when MEA is exposed to higher operating temperatures and cycling conditions.

Thus, in another embodiment, the invention is directed to a membrane electrode assembly comprising a catalyst coated membrane (CCM) sandwiched between at least two gas diffusion layers, wherein the CCM comprises a solid polymer electrolyte membrane having a cathode layer deposited on one side thereof and an anode layer deposited on the opposite side thereof, wherein the anode layer comprises the heat treated, carbon supported platinum/ruthenium alloy nanoparticles as described above. In such a case, the alloy nanoparticle loading in the anode layer is conveniently selected so as to be not greater than about 5 mg of active species (e.g., alloy nanoparticles)/$cm^2$ of the anode layer (e.g., not greater than about 4.5, not greater than about 4, not greater than about 3.5, not greater than about 3, not greater than about 2.5, not greater than about 2, not greater than about 1.5, or not greater than about 1.0 mg of active species/$cm^2$ of the anode layer).

Generally, the heat treated, carbon supported platinum/ruthenium electrocatalyst composition described herein, when used in an anode layer of a membrane electrode assembly having said anode layer and a cathode layer and when the electrocatalyst composition is present in the anode layer at a loading of 3 mg of PtRu/$cm^2$ of the anode layer and when the membrane electrode assembly is used in a direct methanol fuel cell operating under conditions including a supply of 1M methanol at a rate of 3 ml per minute to the anode layer, a supply of 200 sccm of fully humidified $H_2$ to the cathode layer, an output voltage of 0.4 V and a temperature of 60° C., has a mass activity of at least 70 mA, such as at least 90 mA, per mg of platinum and ruthenium in the anode layer.

The invention will now be more particularly described with reference to the following Examples and the accompanying drawings.

Example 1

Comparative 39.1 g of tetra amine Pt nitrate salt (50.48 wt % Pt) and 94.6 g Ru nitrosylnitrate solution (10.83 wt % Ru) are mixed with 284.5 g KetjenBlack EC 600J suspension (7.03 wt % carbon) and 832 g water. All reagents are used as directly supplied from vendors. The combined mixture is sheared for 15-20 minutes until the components are intimately mixed. The feed is then pumped to an atomization unit to form droplets and the droplets are entrained in a gas stream and sprayed into spray conversion equipment such as a spray dryer. The spray dryer is operated with an inlet temperature of 575° C. and an outlet temperature of 320° C.

Figure 2:
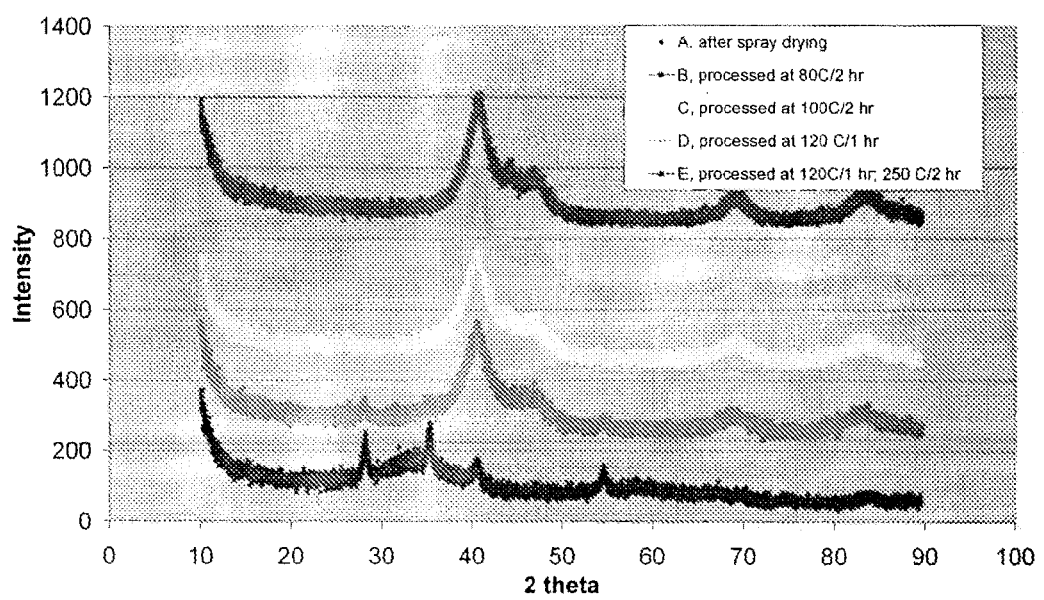
FIG. 2A is the X-Ray diffraction (XRD) spectrum of the spray dried, carbon-supported PtRu electrocatalyst composition of Example 1 (no post treatment).
FIG. 2B is the X-Ray diffraction (XRD) spectrum of the carbon-supported PtRu electrocatalyst composition of Example 1, after post treatment according to Example 2.
FIG. 2C is the X-Ray diffraction (XRD) spectrum of the carbon-supported PtRu electrocatalyst composition of Example 1, after post treatment according to Example 3.
FIG. 2D is the X-Ray diffraction (XRD) spectrum of the carbon-supported PtRu electrocatalyst composition of Example 1, after post treatment according to Example 4.
FIG. 2E is the X-Ray diffraction (XRD) spectrum of the carbon-supported PtRu electrocatalyst composition of Example 1, after post treatment according to Example 5A.

Transmission Electron Microscopy (TEM) of the powder after spray drying shows uniform distribution of nanoparticles in the size range of 2-3 nm (FIG. 1). However, the X-ray diffraction (XRD) pattern shows no Pt alloy fcc phase or any metal precursor peaks (FIG. 2A). Instead a $RuO_2/PtO_2$ phase is observed, indicating that the spray drying step mainly serves to decompose the metal precursors and uniformly distribute metal oxide nanoparticles on the surface of support.

Analysis of the resultant product shows it to contain about 40 wt % platinum, about 20 wt % ruthenium and about 40 wt % carbon.

Example 2

A first sample of the spray dried powder produced in Example 1 is subject to post treatment according to the following protocol:
(a) $N_2$ purge at room temperature (30° C.) for 30 minutes;
(b) Ramp up to 80° C. in $N_2$ at 3° C./minute;
(c) Purge for another 1 hour at 80° C. in $N_2$;
(d) Switch to mixture of 5 vol. % $H_2$ and 95 vol. % $N_2$, and maintain at 80° C. for 2 hours; and
(e) Switch to $N_2$, cool down to room temperature at 3° C./minute before collection.

The XRD measurement of the post treated powder (FIG. 2B) indicates that most of metal oxides have been converted into a PtRu binary alloy phase. The average particle size of the PtRu alloy phase calculated from Scherrer equation is about 3.3 nm.

Example 3

A second sample of the spray dried powder produced in Example 1 is subject to post treatment according to the following protocol:
(a) $N_2$ purge at room temperature (30° C.) for 30 minutes;
(b) Ramp up to 100° C. in $N_2$ at 3° C./minute;
(c) Purge for another 1 hour at 100° C. in $N_2$;
(d) Switch to mixture of 5 vol. % $H_2$ and 95 vol. % $N_2$, and maintain at 100° C. for 2 hours; and
(e) Switch to $N_2$, cool down to room temperature at 3° C./minute before collection.

The XRD measurement of the post treated powder (FIG. 2C) indicates that all of metal oxides have been converted into a PtRu binary alloy phase. The average particle size of the PtRu alloy phase calculated from Scherrer equation is about 3.5 nm.

Example 4

A third sample of the spray dried powder produced in Example 1 is subject to post treatment according to the following protocol:
(a) $N_2$ purge at room temperature (30° C.) for 30 minutes;
(b) Ramp up to 120° C. in $N_2$ at 3° C./minute;
(c) Purge for another 1 hour at 120° C. in $N_2$;
(d) Switch to mixture of 5 vol. % $H_2$ and 95 vol. % $N_2$, and maintain at 120° C. for 1 hour; and
(e) Switch to $N_2$, cool down to room temperature at 3° C./minute before collection.

The XRD measurement of the post treated powder (FIG. 2D) indicates that all of metal oxides have been converted into a PtRu binary alloy phase. The average particle size of the PtRu alloy phase calculated from Scherrer equation is about 3.7 nm.

Example 5

In a first experiment, designated as Example 5A, a fourth sample of the spray dried powder produced in Example 1 is subject to post treatment according to the following protocol:
(a) $N_2$ purge at room temperature (30° C.) for 30 minutes;
(b) Ramp up to 120° C. in $N_2$ at 3° C./minute;
(c) Purge for another 1 hour at 120° C. in $N_2$;
(d) Switch to mixture of 5 vol. % $H_2$ and 95 vol. % $N_2$, and maintain at 120° C. for 1 hour;
(e) Ramp up to 250° C. in mixture of 5 vol. % $H_2$ and 95 vol. % $N_2$ at 3° C./minute;
(f) Maintain at 250° C. for 2 hours in mixture of 5 vol. % $H_2$ and 95 vol. % $N_2$; and
(g) Switch to $N_2$, cool down to room temperature at 3° C./minute before collection.

The XRD measurement of the post treated powder (FIG. 2E) shows that the (111) diffraction peak of PtRu alloy is present at $2\theta=40.387$, indicating significant alloying. Average alloy particle size calculated from Scherrer equation is about 3.7 nm.

Figure 3:
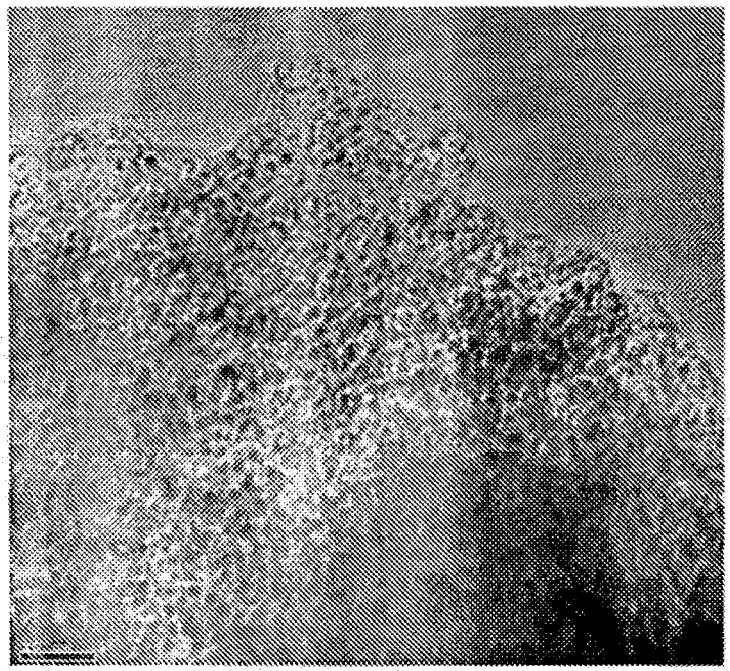
FIGS. 3(A) and (B) are TEMs at different magnifications of the carbon-supported PtRu electrocatalyst composition of Example 1, after post treatment according to Example 5A.
Figure 3:
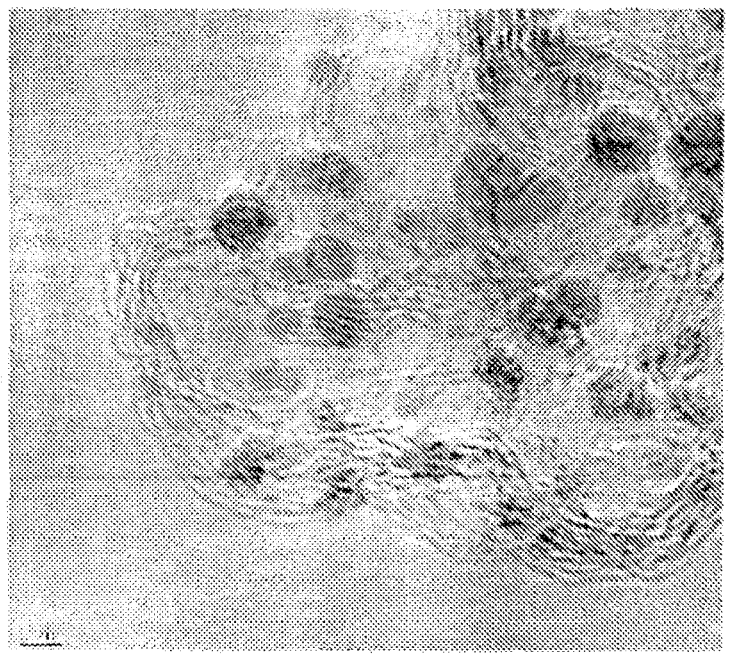

TEM analysis (FIGS. 3A and B) indicates that the metal nanoparticles are well dispersed, and particle size (2-4 nm) is in good agreement with XRD results.

In a second experiment, designated as Example 5B, the post treatment protocol of Example 5A is repeated on a powder produced by performing the spray drying process of Example 1 on a mixture produced by mixing 395.2 g of tetra amine Pt nitrate solution (5 wt % Pt) and 94.6 g Ru nitrosylnitrate solution (10.83 wt % Ru) with 284.5 g KetjenBlack EC 600J suspension (7.03 wt % carbon) and 478 g water. All reagents are used as directly supplied from vendors. XRD measurement (not shown) of the post treated powder indicates that most of metal oxides have been converted into a PtRu binary alloy phase. The average particle size of the PtRu alloy phase calculated from Scherrer equation is about 3.3 nm.

Example 6

A fourth sample of the spray dried powder produced in Example 1 is subject to post treatment according to the following protocol:
(a) $N_2$ purge at room temperature (30° C.) for 30 minutes;
(b) Ramp up to 120° C. in $N_2$ at 3° C./minute;
(c) Purge for another 1 hour at 120° C. in $N_2$;
(d) Switch to mixture of 5 vol. % $H_2$ and 95 vol. % $N_2$, and maintain at 120° C. for 1 hour;
(e) Ramp up to 450° C. in mixture of 5 vol. % $H_2$ and 95 vol. % $N_2$ at 3° C./minute;
(f) Maintain at 450° C. for 2 hours in mixture of 5 vol. % $H_2$ and 95 vol. % $N_2$; and
(g) Switch to $N_2$, cool down to room temperature at 3° C./minute before collection.

The XRD measurement (not shown) of the powder indicates that most of the metal oxides have been converted into a PtRu alloy phase. Average particle size of the alloy phase calculated from Scherrer equation is about 4.0 nm.

Example 7

The sample preparation, atomization and spray drying process of Example 1 is repeated, except spray dryer is operated with an inlet temperature of 540° C. and an outlet temperature of about 300° C.

The resultant spray dried powder is subject to post treatment according to the following protocol:
(a) $N_2$ purge at room temperature (30° C.) for 30 minutes;
(b) Ramp up to 120° C. in $N_2$ at 3° C./minute;
(c) Purge for another 1 hour at 120° C. in $N_2$;
(d) Switch to mixture of 5 vol. % $H_2$ and 95% vol. $N_2$, and maintain at 120° C. for 1 hour;
(e) Ramp up to 450° C. in mixture of 5 vol. % $H_2$ and 95 vol. % $N_2$ at 3° C./minute;
(f) Maintain at 450° C. for 2 hours in mixture of 5 vol. % $H_2$ and 95 vol. % $N_2$; and
(g) Switch to $N_2$, cool down to room temperature at 3° C./minute before collection.

The XRD measurement (not shown) of the powder indicates that most of the metal oxides have been converted into a PtRu alloy phase. Average particle size of the alloy phase calculated from Scherrer equation is about 3.7 nm.

Example 8

(a) MEA Production

A 60% PtRu/KB, where KB designates KetjenBlack EC 600J, electrocatalyst is produced by the spray drying method of Example 1 followed by the post treatment of Example 5A. 1 gm of the resultant catalyst is weighed into a vessel then 8 gm of de-ionized water are added, followed by sonication using ultra sonication horn for 10 minutes. After sonication 5 gm of a 5% Nafion solution in water are added to the catalyst mixture and the mixture is sonicated for an additional 5 minutes. The resultant ink is used to print the anode of a catalyst coated membrane (CCM) on one surface of a Nafion 1135 layer having an active area 25 cm² such that the PtRu alloy loading is 3 mg PtRu/cm² of the anode. The cathode of the CCM is produced by printing an ink containing a 60% Pt/KB catalyst commercially available from Cabot Corporation as Dynalyst® 60KR1 onto the opposite surface of the Nafion layer at a Pt loading of 1.5 mg Pt/cm² of the cathode.

For comparison, two CCMs containing commercial PtRu/C and PtRu black are made. One is produced using a 60% PtRu/C catalyst commercially available from Johnson Matthey under the trade name HISPEC® 10000 as the anode at the same PtRu loading (3 mg PtRu/cm²). On the cathode side of the CCM, 60% Pt/KB catalyst commercially available from Cabot Corporation as Dynalyst® 60KR1 is printed at a Pt loading of 1.5 mg Pt/cm². The other CCM is produced using PtRu black commercially available from Johnson Matthey under the trade name HiSPEC® 6000 as the anode at a PtRu loading of 8 mg PtRu/cm². On the cathode side of the CCM, 60% Pt/KB catalyst commercially available from Cabot Corporation as Dynalyst® 60KR1 is printed at a Pt loading of 2 mg Pt/cm². In both cases, the solid polymer electrolyte membrane is Nafion 1135.

For each of the resultant CCMs, identical paper type gas diffusion layers are applied to the anode and cathode to make a membrane electrode assembly (MEA).

(b) MEA Testing

The resultant MEAs are tested in a direct methanol fuel cell, with 1M methanol being supplied to the anode at a rate of 3 m/min without back pressure, and 400 sccm of dry air being supplied to the cathode also without back pressure. While fuel cell polarization curve gives a good indication of overall powder output of a fuel cell, it is combination of effects of the anode catalyst layer, cathode catalyst layer, methanol crossover, etc. Therefore anode polarization curves are obtained for direct analysis of anode catalyst activity in MEA configuration. During the anode polarization measurement, 1M methanol is supplied to the anode at a rate of 3 m/min without back pressure, and 200 sccm of fully humidified $H_2$ is supplied to the cathode also without back pressure. The anode polarization curves are obtained by applying potential sweeps at the rate of 2 mV/sec between 0.1V and 0.7V.

Figure 4:
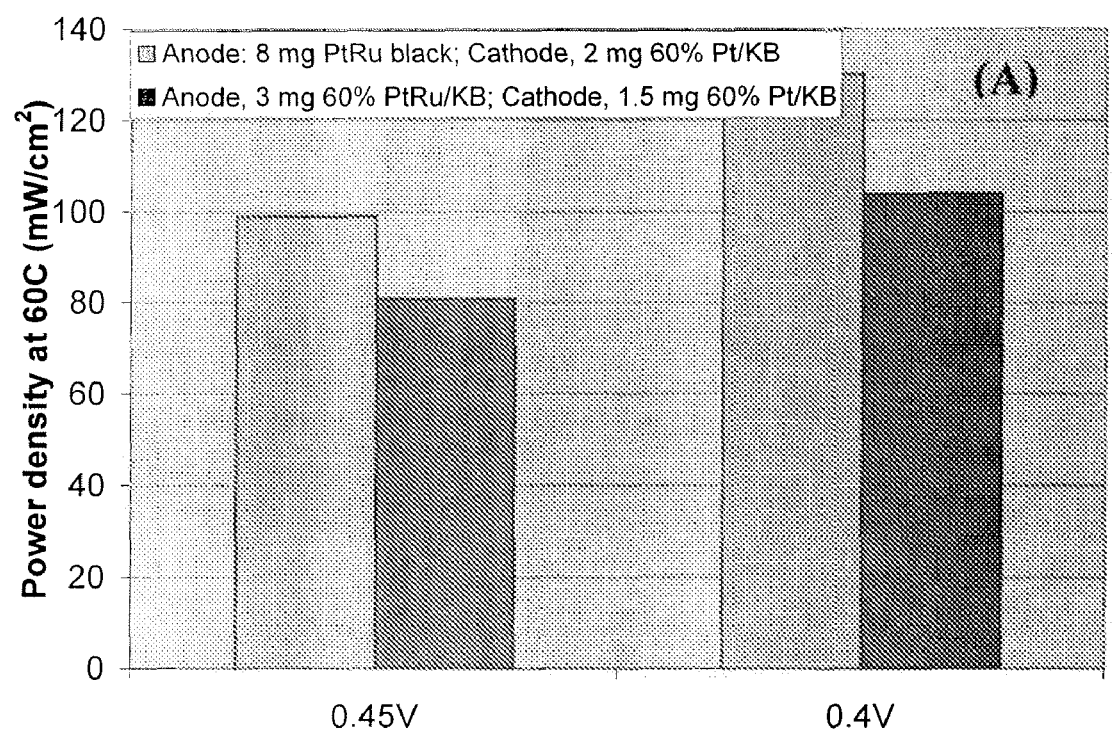
FIG. 4 is a graph comparing the absolute performance at 0.45 V and 0.4 V of MEAs comprising, as the anode catalysts, the post-treated, carbon-supported PtRu electrocatalyst composition of Example 5A and a commercial PtRu black, respectively, when the MEAs are tested at 60° C. in a direct methanol fuel cell.

FIG. 4 shows that the MEA produced using the electrocatalyst of Example 5A in the anode layer, when compared at 0.4V and 0.45V, exhibits 80% of the absolute performance of the MEA produced using the HiSPEC® 6000 in the anode layer even though the PtRu loading in the MEA made with electrocatalyst of Example 5A is less than half of that of the MEA made with HiSPEC® 6000 electrocatalyst. This result is an indication of the high activity of the electrocatalyst of Example 5A in the anode layer and demonstrates that when using the catalysts described herein significant reduction of metal loadings in DMFC MEAs can be achieved leading to reduction of cost without significant loss of performance.

Figure 5:
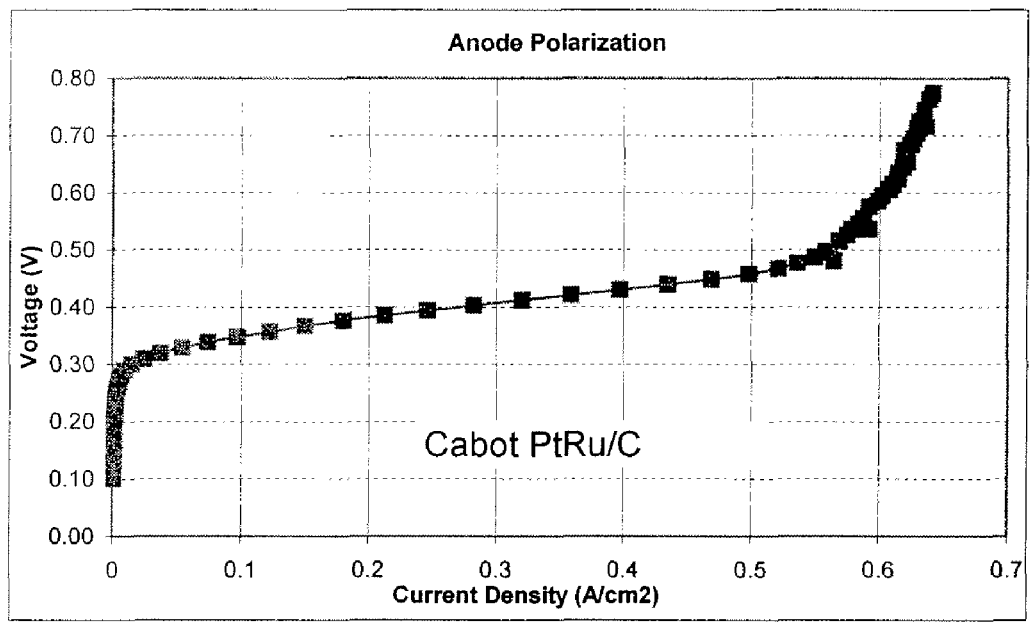
FIG. 5 is an anode polarization graph for an MEA for a direct methanol fuel cell produced using the post-treated, carbon-supported PtRu electrocatalyst composition of Example 5A as the anode catalyst.
Figure 6:
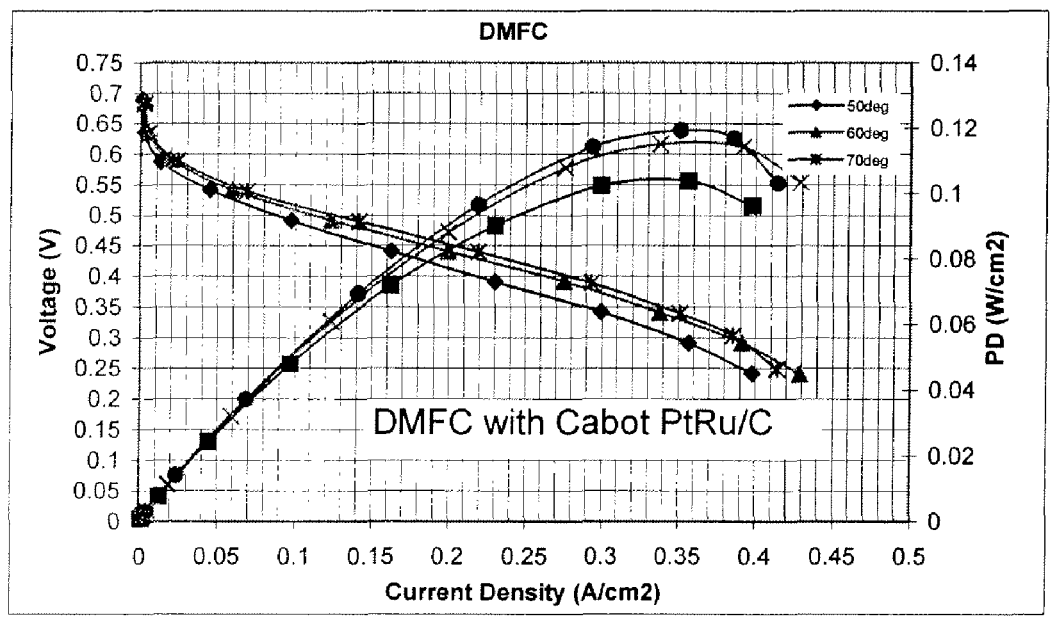
FIG. 6 is graph of electrical performance at temperatures of 50° C., 60° C. and 70° C. for an MEA for a direct methanol fuel cell produced using the post-treated, carbon-supported PtRu electrocatalyst composition of Example 5A as the anode catalyst.
Figure 7:
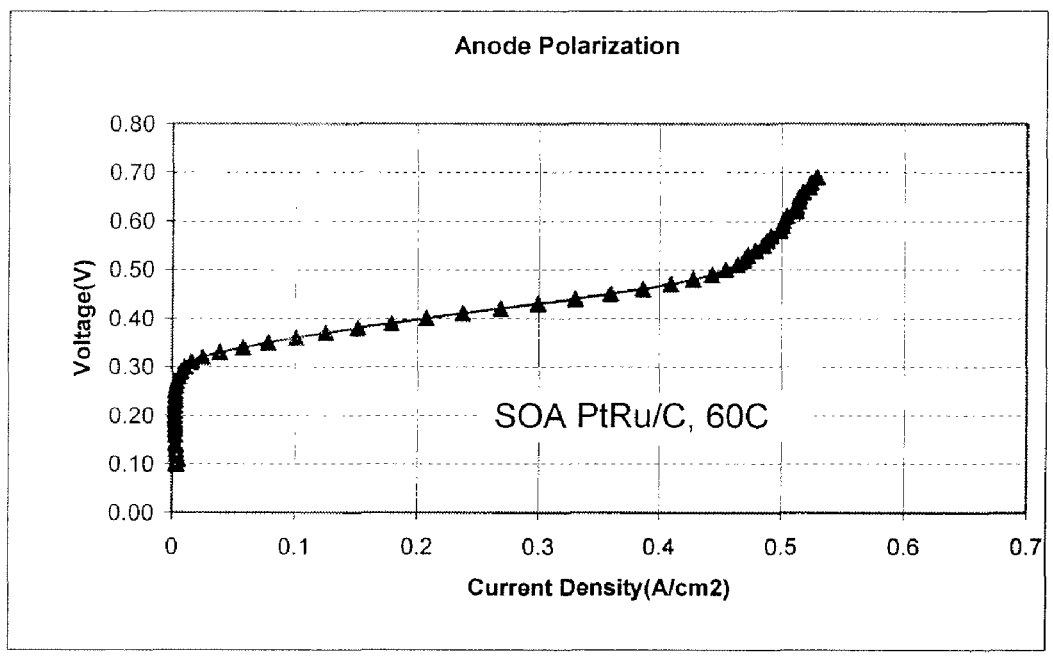
FIG. 7 is an anode polarization graph for an MEA for a direct methanol fuel cell produced using a commercially available carbon-supported PtRu electrocatalyst as the anode catalyst.
Figure 8:
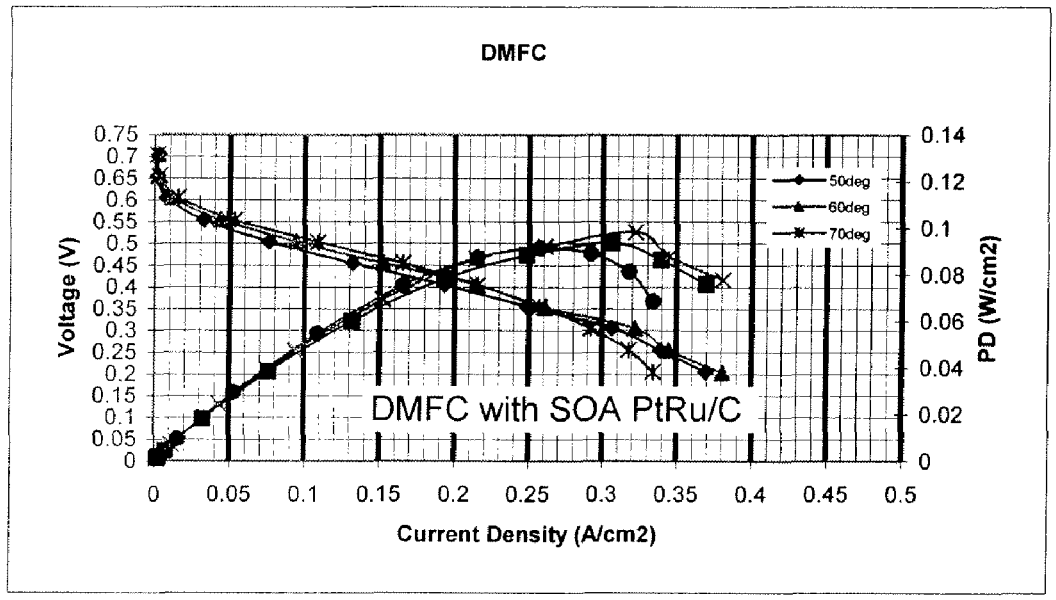
FIG. 8 is graph of electrical performance at temperatures of 50° C., 60° C. and 70° C. for an MEA for a direct methanol fuel cell produced using a commercially available carbon-supported PtRu electrocatalyst as the anode catalyst.

The anode polarization of MEA using the electrocatalyst of Example 5A in the anode layer at 60° C. is shown in FIG. 5 and the performance of the cell at various temperatures of 50° C., 60° C. and 70° C. is shown in FIG. 6. As a comparison, FIGS. 7 and 8 show the anode polarization and cell performance respectively under the same conditions for an equivalent MEA containing 60% PtRu/C catalyst commercially available from Johnson Matthey under the trade name HiSPEC® 10000. The results are summarized in FIG. 9, from which it will be seen that the electrocatalyst of Example 5 shows 35% higher current density in the anode polarization at an output voltage of 0.4V at 60° C. and 20% higher power density at 0.45V at 60° C. as compared to the MEA shown in FIGS. 7 and 8.

Figure 9:
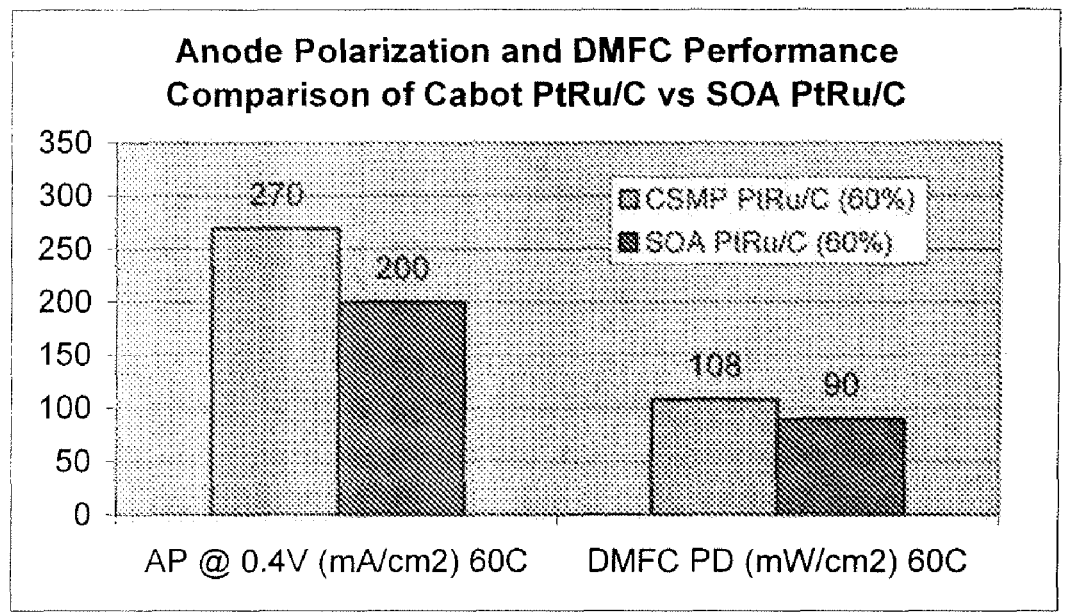
FIG. 9 compares the anode polarization current density at 0.4 V derived from the anode polarization graphs at 60° C. for the MEAs presented in FIGS. 5 and 7 and compares the power density at 60° C. derived from the methanol air polarization curves for the MEAs presented in FIGS. 6 and 8.

The anode polarization data presented in FIGS. 5 and 7 and summarized in FIG. 9 are further used to compare the normalized performance of the anode catalysts used in the MEAs. A normalized performance is calculated from the anode polarization data in the following way: the anode polarization current density (mA/cm²) at a given output voltage V (for example 270 mA/cm² at 0.4V) is divided by PtRu loading in the anode layer (mgPtRu/cm²) and a normalized performance of the anode electrocatalyst in terms of mA/mgPtRu at the given voltage is derived.

Example 9

In this Example, electrochemical measurements utilizing the thin film rotating disk electrode (TFRDE) method are performed on six catalysts, namely the supported 60 wt. % $Pt_{50}Ru_{50}$/KB catalysts, produced in processes described in Examples 5A, 5B, 6 and 7, hereafter labeled as CSMP-5A, CSMP-5B CSMP-6 and CSMP-7, respectively and, for the sake of comparison, on state-of-the-art supported 60 wt. % $Pt_{50}Ru_{50}$/C (HiSPEC® 10000) and state-of-the-art un-supported $Pt_{50}RU_{50}$ black (HiSPEC® 6000) samples (hereafter labeled SOA-C and SOA-Black, respectively).

Initially catalysts suspensions are prepared in two steps. In the first step, catalysts are weighted (16-25 mg) and dispersed in the amount of water (ULTREX® II Ultrapure reagent by JT Baker) required to prepare dispersion with concentration of 4 $mg_{catalyst}$/mL. Catalysts suspensions are, then, ultrasonicated for 20 minutes and left overnight to insure maximum wetting and catalyst dispersibility. The second suspension is prepared from the first suspension after additional 20 minutes ultra-sonication, by pipetting the 200 μL of the first suspension and re-dispersing it in 800 μL of water. The concentration (and the total volume, 1 mL) of the second catalyst suspension is the same for all the samples, 0.8 $mg_{catalyst}$/mL. 20 μL of the ultrasonically re-dispersed (20 minutes) second catalysts suspension is then deposited on the glassy carbon disk electrodes (Pine Instruments), 5 mm diameter, polished to a mirror-finish before each experiment (0.05 μm alumina, Buehler), resulting in a constant catalyst loading of 81.6 μg/cm$^2$. After drying in flowing high purity nitrogen at room temperature, the deposited catalyst layer is then covered with 14 μL of a diluted aqueous Nafion® solution (starting solution 5 wt % in mixture of lower aliphatic alcohols and water by Aldrich, diluted to 1 Nafion/100 $H_2O$). The resulting Nafion film thickness of ≦0.2 μm is of sufficient strength to attach the catalyst particles permanently to the glassy carbon disk electrode substrate without producing significant diffusion resistance through the film. Finally, the electrode(s) are immersed in argon purged 0.5 M $H_2SO_4$ (Sulfuric acid, ULTREX® II Ultrapure Reagent by JT Baker) electrolyte under potential control at 75 mV vs. RHE.

All electrochemical measurements are conducted in a thermostated three-compartment electrochemical cell. The reference electrode is a saturated calomel electrode (SCE), separated from the working electrode compartment by a closed electrolyte bridge in order to avoid chloride contamination. All the potentials in this study, however, refer to that of the reversible hydrogen electrode (RHE) in the same electrolyte. Calibration of the reference electrode, in the given electrolyte and the given temperature, on the reversible hydrogen electrode scale is done by measuring the hydrogen oxidation/evolution polarization curves in hydrogen saturated solution on a polycrystalline bulk Pt electrode. All gases used in this study are Research Purity Grade, purchased from Matheson Tri-Gas. The potentiostat is PAR BiStat and is computer controlled. The rotator unit is manufactured by Pine Instruments, model MSR.

Figure 10:
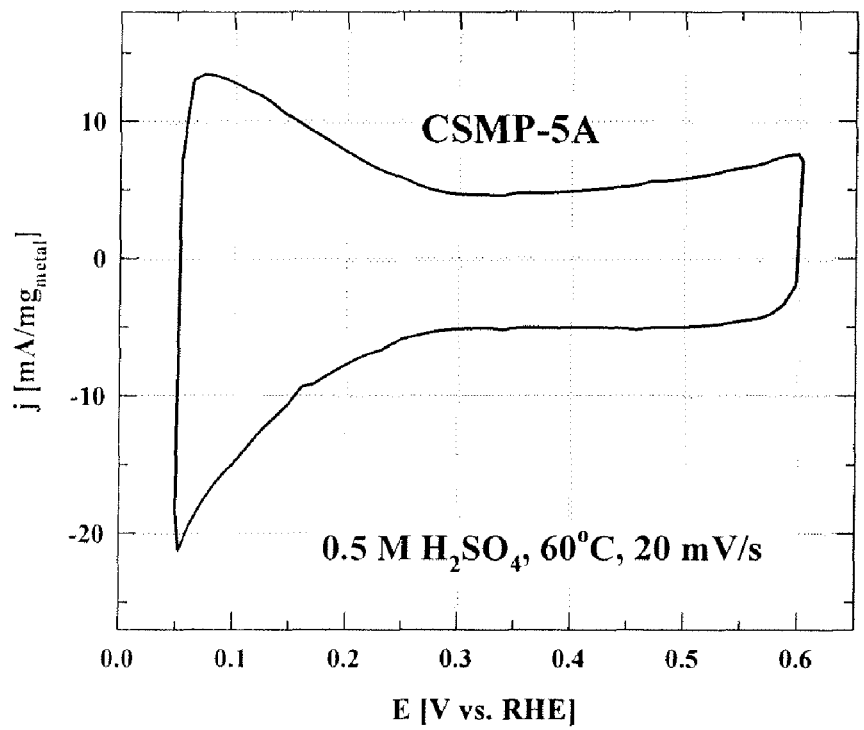
FIG. 10 is a cyclic voltammogram of an electrode produced using the post-treated, carbon-supported PtRu electrocatalyst composition of Example 5A in an argon purged 0.5 M $H_2SO_4$ solution at 60° C. and 20 mV/s.

FIG. 10 illustrates a representative voltammogram of a supported (CSMP-5A) $Pt_{50}Ru_{50}$ catalyst. Consistent with voltammetric features for bulk electrodes, the $H_{upd}$ region (0.05<E<0.3 V) is first followed by reversible adsorption of OH and then by irreversible oxide formation.

Figure 11:
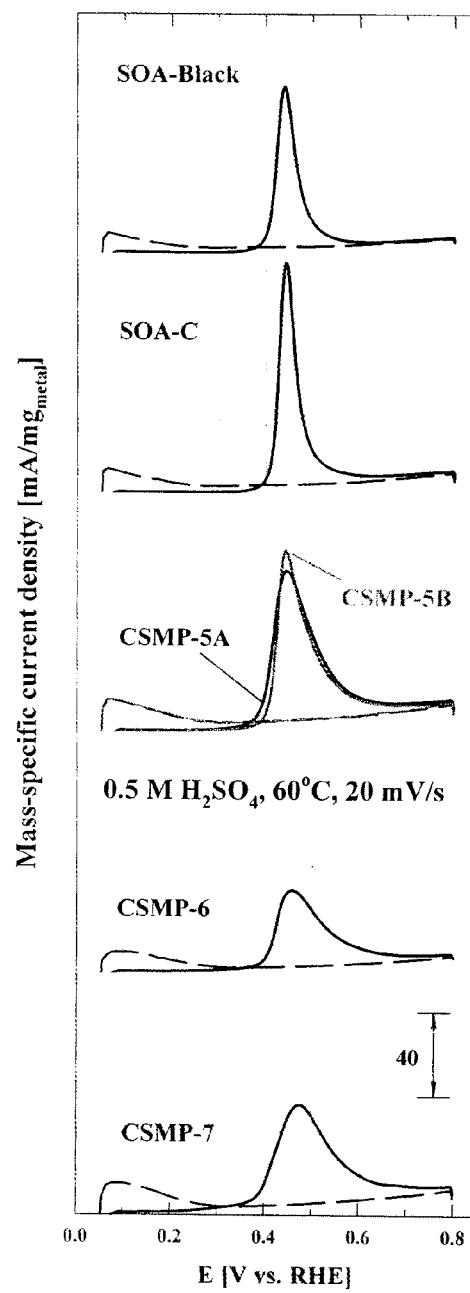
FIG. 11 shows the results of CO stripping voltammetry in 0.5 M $H_2SO_4$ at 60° C. and 20 mV/s on electrodes produced using the post-treated, carbon-supported PtRu electrocatalyst compositions of Examples 5A, 5B, 6 and 7 and two commercially available electrocatalyst compositions.

FIG. 11 summarizes results for the stripping voltammetry of saturated monolayers of CO on all six catalysts in 0.5 M $H_2SO_4$ at 60° C. For the sake of more condensed representation only the anodic currents in the voltammetry after the stripping of CO are plotted. The saturated coverage of CO on all surfaces is achieved by holding the electrode potential at 0.075 V for 5 minutes without rotation during the CO gas introduction to the solution, and for additional 2 minutes on electrode rotated at 1600 rpm. Subsequently, the CO gas is removed from the solution by purging the solution with argon for 15 minutes. The sweep rate is 20 mV/s. The common feature of the CO stripping voltammetry on all samples tested is the onset of CO oxidation at almost the same potential, indicated by the intersection of CO oxidation currents with the pseudocapacitive currents in the absence of adsorbed CO (intersection of currents in first and second positive voltammetric sweep). This observation is in agreement with the adsorbed CO oxidation on bulk alloys with different Pt to Ru ratio, and is explained by the nucleation of oxygen-containing species on the small fraction of bare (freed from $H_{upd}$) Ru sites, which then catalyze the CO electrooxidation reaction. As long as there is sufficient amount of Ru surface sites, the onset of the CO oxidation reaction is insensitive to the actual surface Pt:Ru ratio and, ideally, coincides with the thermodynamic potential of water activation on Ru surface atoms. However, after the reaction of CO oxidation starts, the CO oxidation peak maximum and peak width, related to the reaction kinetics, will depend on parameters such as surface composition, particle size, particle shape, particle morphology, etc. When compared with the CO stripping electrooxidation on pure Pt, the effect of alloying Pt with Ru is extreme activity enhancement based on the negative shift in stripping peak position as a function of Ru surface composition, accompanied with the significant decrease in the corresponding peak widths.

Figure 12:
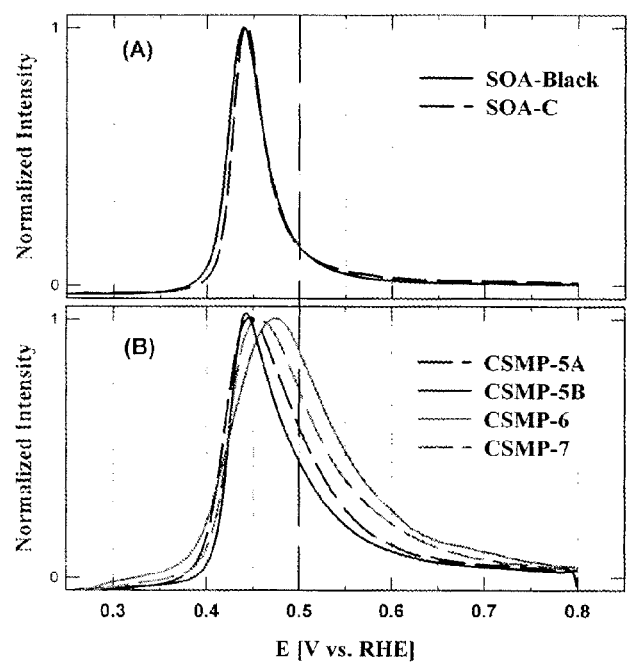
FIG. 12 shows CO stripping peaks obtained after subtraction of voltammogram in the second positive sweep direction for the electrodes shown in FIG. 11 and normalized to the corresponding peak maximum.

The difference in the peak position and the peak width at half peak maximum height (FWHM), obtained after subtracting the pseudocapacitive features in the second positive voltammetric sweep, for all tested samples is shown in FIG. 12. For the sake of more straightforward comparison, all CO stripping peaks are normalized to the corresponding peak maximum. Peak position for SOA-C, SOA-Black, CSMP-5A and CSMP-5B samples are very close to each other (Table 1) and somewhat shifted to higher potential for CSMP-6 and CSMP-7 catalysts. However, the most striking difference between state-of-the-art, both supported and un-supported $Pt_{50}Ru_{50}$ catalysts, and CSMP supported $Pt_{50}Ru_{50}$ catalysts is the peak width at half peak maximum height (FWHM). The broader CO stripping peaks (>0.05 V) on all four of the CSMP supported catalysts may be understood by the slower reaction kinetics, which in turn might be explained by hindered diffusion migration of CO adsorbed on Pt surface atoms in order to reach oxygen-containing species adsorbed on Ru atoms. The fact that CO stripping peaks for all CSMP samples show tailing at higher potentials, further supports the finding of obstructed diffusion mobility of adsorbed CO. This hindrance of CO diffusion mobility probably originates from the stronger CO adsorption on the surface. Considering that the adsorption strength, and hence diffusion mobility of the CO adsorbed on the surface depends on the parameters such as particle size, particle surface composition and particle morphology, these results clearly indicate that CSMP supported $Pt_{50}Ru_{50}$ catalysts have unique properties when compared to the state-of-the-art supported and un-supported $Pt_{50}Ru_{50}$ catalysts.

The integrated CO stripping charge under the peaks in FIG. 11 are used to calculate the electrochemically accessible surface area for each catalyst, assuming 420 μCcm$^{-2}$ per CO monolayer. The results for electrochemical surface area for all the samples calculated in this way are shown in Table 1. Based on results in Table 1, CSMP-5A and B catalysts show significantly higher surface area (90-95 m$^2$/$g_{metal}$) compared to SOA-C and SOA-Black (50-70 m$^2$/$g_{metal}$), giving them starting advantage in catalytic processes where the surface is the active phase, such is the case with the methanol electrooxidation.

Figure 13:
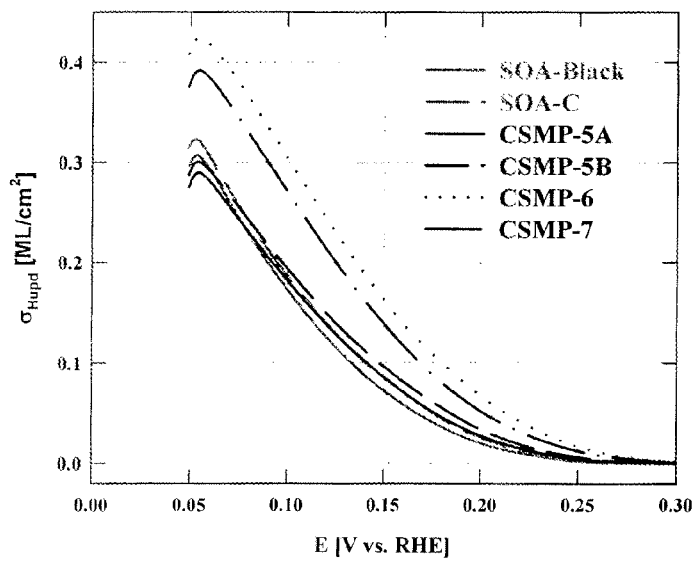
FIG. 13 shows $H_{upd}$ adsorption isotherms for the electrodes shown in FIG. 11.

In FIG. 13 are shown $H_{upd}$ adsorption isotherms, for all samples, obtained by integration of the positive going sweep in cyclic voltammetry in the range 0.05 V<E<0.3 V, after subtracting the pseudo-capacitive contribution, taken at 0.35 V. Here, it is assumed that the total charge of 210 μC corresponds to the full monolayer of $H_{upd}$ per cm$^2$. Whereas the $H_{upd}$ coverage on CSMP-5A, CSMP-5B, SOA-C and SOA-Black is very similar, on CSMP-6 and CSMP-7 electrodes it is significantly higher. Significantly higher $H_{upd}$ coverage on CSMP-6 and CSMP-7 samples indicate the Pt surface enrichment, which is in agreement with the thermodynamic consideration for preferential Pt surface segregation on PtRu system, and in agreement with observations on bulk alloys.

Obviously, the processing and the post-processing temperature profile plays extremely important role in catalyst design and optimization.

Following the CO stripping voltammetry and electrochemical surface area determination the electrodes are lifted from the electrolytic solution (while maintaining the potential control), the right amount of methanol (Methyl Alcohol, UltimAR® 99.9% min. by Mallinckrodt CHEMICALS) is injected into the solution to give 1M $CH_3OH$ in 0.5 M $H_2SO_4$, and subsequently the electrodes are immersed back to the solution. All electrodes are contacted with the methanol solution at 0.075 V. The electrodes are held for additional 5 minutes at 0.075 V before stepping to 0.4 V. As a way to simulate the steady state conditions the electrodes are held at 0.4 V for 10 minutes. The disk electrode for methanol electrooxidation is used in stationary regime. The results of methanol electrooxidation for all samples are summarized in Table 1.

TABLE 1

| Catalyst | Peak Position at 60° C. (V) | Width at 60° C. (V) | Surface Area $m^2$/g metal | $\mu A/cm^2$ at 0.4 V | mA/mg metal at 0.4 V |
|---|---|---|---|---|---|
| CSMP-5A | 0.447 | 0.106 | 95 | 42.2 | 40.2 |
| CSMP-5B | 0.438 | 0.077 | 90 | 53 | 44.5 |
| CSMP-6 | 0.458 | 0.119 | 58 | 35.1 | 20.1 |
| CSMP-7 | 0.478 | 0.145 | 87 | 30.5 | 27.2 |
| SOA-C | 0.445 | 0.041 | 70 | 46.3 | 32.2 |
| SOA-Black | 0.441 | 0.047 | 53 | 50.47 | 26.81 |

Activities in Table 1 are quoted, both, in terms of surface-specific current densities [$mA/cm^2$] and in terms of mass-specific current densities (in $mA/mg_{metal}$, based on the noble metal mass). Mass-specific activity is a parameter that defines how much expensive noble metal has to be loaded to achieve desired absolute performance, while the surface-specific activity is parameter that defines the intrinsic properties of the alloy phase nanoparticles. When different samples are compared in terms of their surface-specific activity that means that they are compared for their intrinsic catalytic activity dependent only on fundamental parameters such as surface concentration of active sites ($cm^{-2}$) and turn-over-frequency (TOF) ($s^{-1}$). The higher surface-specific activity indicates truly superior catalyst. Surface-specific activity, coupled with the mass normalized surface area ($m^2$/g) determines the mass-specific activity. An advanced catalyst which demonstrates high mass-specific activity would be one that preferably combines high surface specific activity and high mass normalized surface area.

Figure 14:
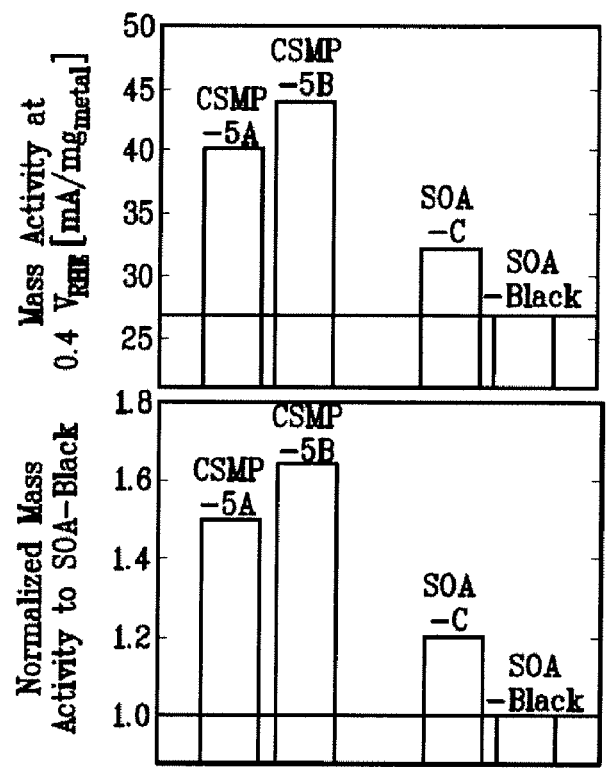
FIG. 14 shows mass-specific activity for supported and un-supported PtRu catalysts in terms of absolute activity and in terms of mass-activity normalized to unsupported PtRu commercially available electrocatalyst after 10 minutes potential hold at 0.4 $V_{RHE}$.

Based on the results for methanol oxidation shown in Table 1, CSMP-5A and CSMP-5B outperform both the SOA-Black and SOA-C electrodes in terms of mass-specific activity. Compared to the SOA-Black, CSMP-5A catalyst has somewhat lower surface-specific activity, but outperforms significantly the SOA-Black in terms of mass activity, in agreement with the difference in metal dispersion (95 $m^2/g_{metal}$ for CSMP-5A compared to only 53 $m^2/g_{metal}$ for SOA-Black). In addition, CSMP-5B catalyst shows superior performance compared to SOA-Black and SOA-C not only in terms of mass-specific activity but also in terms of surface-specific activity indicating an intrinsically superior catalyst, which coupled with the much higher mass normalized surface areas results in mass-specific activity improvement of almost double when using the mass-specific activity of SOA-Black as a baseline. This can be seen in FIGS. 14(A) and (B). The activity of CSMP-6 and CSMP-7 catalyst post-processed at higher temperature, when compared to CSMP-5A and CSMP-5B (Table 1) catalysts, reinforces the finding that the processing and post-processing temperature profile of the current invention plays a crucial role in catalyst design and optimization and in achieving of high mass and surface specific activity.

Figure 15:
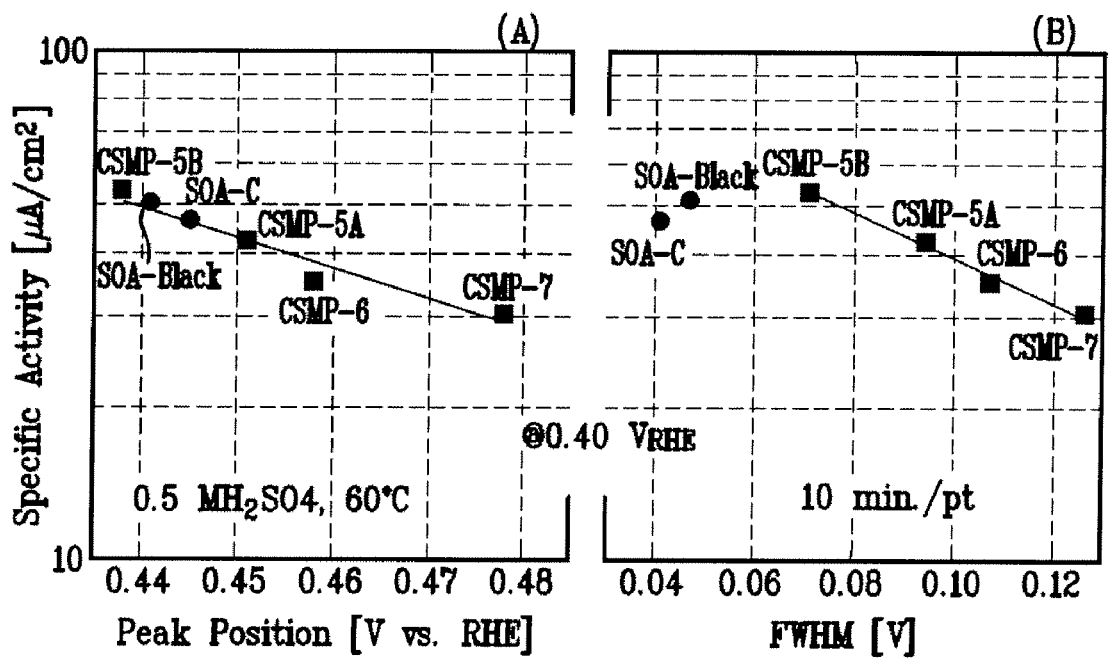
FIGS. 15A and B shows surface-specific activity for methanol electrooxidation at 0.4 $V_{RHE}$ for supported and unsupported PtRu electrocatalysts as a function of position of CO stripping peak (FIG. 15A) and full width at half maximum of the CO stripping peak (FWHM) (FIG. 15B).

Today there is consensus that at low overpotentials for methanol electrooxidation the process is dominantly influenced by the ability of surface to activate water and to effectively remove inhibiting CO intermediate. This can be seen from FIG. 15. Here methanol electrooxidation currents after holding the potential at 0.4 $V_{RHE}$ for 10 minutes are given as a function of the CO stripping peak maximum (FIG. 15(A)) and as a function of the CO stripping peak width at half maximum (FWHM) (FIG. 15(B)). Both parameters are intimately connected to the activity toward the CO oxidation.

The higher the activity for the CO oxidation, the more is the CO stripping peak shifted to negative potentials followed by decrease in the peak width. When only CSMP catalysts are compared, a clear trend emerges. By improving the CO tolerance of the catalyst, overall methanol electrooxidation activity is increasing. SOA-Black and SOA-C catalysts follow the same trend, but only when the position of CO stripping peak maximum is taken into the analysis (FIG. 15(A)). When the peak width is considered there is clear discontinual change. CO stripping peak for both SOA-Black and SOA-C catalysts are almost half the CO stripping peak width of CSMP catalysts, and yet this change does not translate to methanol electrooxidation activity improvement, as can be seen from FIG. 15(B). This clearly indicates that the CSMP catalysts have unique properties toward the methanol electrooxidation when compared to the SOA-Black and SOA-C electrocatalysts.

From FIGS. 15(A) and (B) it is clear that CSMP-5B catalyst, although not the most CO tolerant catalyst, is the best optimized methanol electrooxidation catalyst. This is manifested by the highest surface-specific activity for the methanol electrooxidation. When the mass-specific activity of the SOA-Black is taken as a baseline, the CSMP-5A and CSMP-5B catalysts show activity improvement by a factor of 1.5-1.7 (FIG. 14(B)) as compared with the SOA-Black and SOA-C catalysts, suggesting that it is possible to achieve the same absolute performance in MEA with almost the two times reduction in the noble metal loading, consistent with the MEA characterization data.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. An electrocatalyst composition comprising carbon substrate particles and nanoparticles comprising a platinum and ruthenium binary alloy disposed on the surface of the substrate particles, wherein the electrocatalyst composition, when subjected to CO stripping voltammetry in 0.5 M $H_2SO_4$ at 60° C. and 20 mV/s, exhibits a CO stripping peak at less than 0.46 V, wherein said peak has a width at half maximum height in excess of 0.05 V.

2. The composition of claim 1, wherein said CO stripping peak is at less than 0.44 V.

3. The composition of claim 1, wherein said CO stripping peak exhibits a width at half maximum height in excess of 0.08V.

4. The composition of claim 1, wherein said CO stripping peak exhibits a width at half maximum height no more than of 0.1 V.

5. The composition of claim 1, wherein said nanoparticles have a number average particle size of from about 2 about 5 nm.

6. The composition of claim 1, wherein said nanoparticles have a number average particle size of from about 2.5 to about 4 nm.

7. The composition of claim 1, wherein said nanoparticles have a number average particle size of from about 2.5 to about 3.5 nm.

8. The composition of claim 1, wherein said nanoparticles have a number average particle size of from about 1 to about 5 nm.

9. The composition of claim 1, wherein said carbon particles have a number average particle size of from about 10 to about 100 nm.

10. The composition of claim 1, wherein said carbon particles have a number average particle size of from about 20 to about 80 nm.

11. The composition of claim 1, wherein said carbon particles have a number average particle size of from about 30 to about 50 nm.

12. The composition of claim 1, wherein said carbon particles are agglomerated into substantially spherical, mesoporous agglomerates having a weight average particle size of about 1 to about 10 microns.

13. The composition of claim 12, wherein said substantially spherical, mesoporous agglomerates having a weight average particle size of about 3 to about 8 microns.

14. The composition of claim 12, wherein said substantially spherical, mesoporous agglomerates having a weight average particle size of about 5 to about 6 microns.

15. An electrocatalyst composition comprising carbon substrate particles and nanoparticles comprising a platinum and ruthenium binary alloy disposed on the surface of the substrate particles, wherein the electrocatalyst composition has an electrochemically accessible surface area, as measured by CO stripping voltammetry in 0.5 M $H_2SO_4$ at 60° C. and 20 mV/s, of at least 80 $m^2/g$ of platinum and ruthenium and exhibits a CO stripping peak at less than 0.46 V, wherein said peak has a width at half maximum height in excess of 0.05V.

16. The composition of claim 15, wherein said electrocatalyst composition has an electrochemically accessible surface area, as measured by CO stripping voltammetry in 0.5 M $H_2SO_4$ at 60° C. and 20 mV/s, of at least 90 $m^2/g$ of platinum and ruthenium.

17. The composition of claim 15, wherein said nanoparticles have a number average particle size of from about 2 to about 5 nm.

18. The composition of claim 15, wherein said nanoparticles have a number average particle size of from about 2.5 to about 4 nm.

19. The composition of claim 15, wherein said nanoparticles have a number average particle size of from about 2.5 to about 3.5 nm.

20. The composition of claim 15, wherein said nanoparticles have a number average particle size of from about 1 to about 5 nm.

21. The composition of claim 15, wherein said carbon particles have a number average particle size of from about 10 to about 100 nm.

22. The composition of claim 15, wherein said carbon particles have a number average particle size of from about 20 to about 60 nm.

23. The composition of claim 15, wherein said carbon particles have a number average particle size of from about 30 to about 50 nm.

24. The composition of claim 15, wherein the carbon particles are agglomerated into substantially spherical, mesoporous agglomerates having a weight average particle size of about 1 to about 10 microns.

25. The composition of claim 24, wherein said substantially spherical, mesoporous agglomerates having a weight average particle size of about 3 to about 8 microns.

26. The composition of claim 24, wherein said substantially spherical, mesoporous agglomerates having a weight average particle size of about 5 to about 6 microns.

27. An electrocatalyst composition comprising carbon particles and nanoparticles comprising a platinum and ruthenium binary alloy disposed on the surface of the substrate particles wherein, when the electrocatalyst composition is used in an anode layer of a membrane electrode assembly having said anode layer and a cathode layer and when the electrocatalyst composition is present in the anode layer at a loading of 3 mg of PtRu/$cm^2$ of the anode layer and when the membrane electrode assembly is used in a direct methanol fuel cell operating under conditions including a supply of 1M methanol at a rate of 3 ml per minute to the anode layer, a supply of 200 sccm of humidified $H_2$ to the cathode layer, an output voltage of 0.4 V and a temperature of 60° C., the electrocatalyst composition has a mass activity of at least 70 mA per mg of platinum and ruthenium in the anode layer and an electrochemically accessible surface area, as measured by CO stripping voltammetry 0.5 M $H_2SO_4$ at 60° C. and 20 mV/s, of at least 80 $m^2/g$ of platinum and ruthenium and exhibits a CO stripping peak at less than 0.46 V, wherein said peak has a width at half maximum height in excess of 0.05V.

28. The composition of claim 27, wherein the electrocatalyst composition has a mass activity of at least 90 mA per mg of platinum and ruthenium in the anode layer.

29. The composition of claim 27, wherein the carbon particles are agglomerated into substantially spherical, mesoporous agglomerates having a weight average particle size of about 1 to about 10 microns.

30. A catalyst coated membrane comprising a polymer electrolyte membrane coated on one side thereof with an anode layer comprising the electrocatalyst composition of claim 1.

31. A membrane electrode assembly comprising at least two gas diffusion layers having the catalyst coated membrane of claim 29 sandwiched therebetween.

32. A catalyst coated membrane comprising a polymer electrolyte membrane coated on one side thereof with an anode layer comprising the electrocatalyst composition of claim 15.

33. A membrane electrode assembly comprising at least two gas diffusion layers having the catalyst coated membrane of claim 32 sandwiched therebetween.

34. A catalyst coated membrane comprising a polymer electrolyte membrane coated on one side thereof with an anode layer comprising the electrocatalyst composition of claim 27.

35. The catalyst coated membrane of claim 34 wherein the electrocatalyst composition is present in the anode layer at a loading of at least 2 mg of PtRu/$cm^2$ of the anode layer.

36. The catalyst coated membrane of claim 34 wherein the electrocatalyst composition is present in the anode layer at a loading of about 3 to about 5 mg of PtRu/$cm^2$ of the anode layer.

37. A membrane electrode assembly comprising at least two gas diffusion layers having the catalyst coated membrane of claim 34 sandwiched therebetween.

* * * * *